(12) United States Patent
Matsuura et al.

(10) Patent No.: US 6,854,802 B2
(45) Date of Patent: Feb. 15, 2005

(54) SEAT RECLINER FOR VEHICLE

(75) Inventors: Hiroshi Matsuura, Hamamatsu (JP); Tetsuya Ohba, Toyohashi (JP)

(73) Assignee: Fujikiko Kabushiki Kaisha, Kosai (JP)

( * ) Notice: Subject to any disclaimer, the term of this patent is extended or adjusted under 35 U.S.C. 154(b) by 0 days.

(21) Appl. No.: 10/672,511

(22) Filed: Sep. 26, 2003

(65) Prior Publication Data

US 2004/0066078 A1 Apr. 8, 2004

(30) Foreign Application Priority Data

Oct. 1, 2002 (JP) .................................... P2002-289224
Jun. 2, 2003 (JP) .................................... P2003-157193

(51) Int. Cl.[7] .......................................... B60N 2/235
(52) U.S. Cl. ....................................... 297/367
(58) Field of Search ............................ 297/367, 378.12

(56) References Cited

U.S. PATENT DOCUMENTS

| | | | | |
|---|---|---|---|---|
| 5,590,931 A | * | 1/1997 | Fourrey et al. | 297/366 |
| 5,664,837 A | * | 9/1997 | Takagi | 297/367 |
| 6,085,386 A | * | 7/2000 | Blanchard et al. | 16/325 |
| 6,220,666 B1 | * | 4/2001 | Ohya | 297/367 |
| 6,312,053 B1 | * | 11/2001 | Magyar | 297/367 |
| 6,554,361 B2 | * | 4/2003 | Reubeuze et al. | 297/367 |
| 6,634,713 B2 | * | 10/2003 | Nonomiya et al. | 297/367 |
| 6,648,414 B2 | * | 11/2003 | Ikegaya et al. | 297/367 |

FOREIGN PATENT DOCUMENTS

| | | |
|---|---|---|
| JP | 2002-010847 | 1/2002 |
| JP | 2002-291563 | 10/2002 |

* cited by examiner

*Primary Examiner*—Peter R. Brown
(74) *Attorney, Agent, or Firm*—Brenda O. Holmes; Kilpatrick Stockton LLP

(57) ABSTRACT

The seat recliner includes a base (10) mounted to a first seat member. The seat recliner includes a gear (60) mounted to a second seat member and being rotatable relative to the base. The gear has first teeth (61) along a peripheral face of the gear. The seat recliner includes a locking member (20) movable inside of the first teeth. The locking member has second teeth (21) engageable with the first teeth. The seat recliner includes a cam (40) configured to rotate the locking member to engage the first and second teeth with each other for establishing an angle between the first and second seat members. The seat recliner includes a guide (11B) on the base and having a guide face (11b) for slidably guiding the locking member to engage the first and second teeth with each other. The guide extends radially from a vicinity of the first teeth to a vicinity of the cam. A near side of the guide relative to the first teeth and the locking member define a gap (G1) therebetween.

8 Claims, 18 Drawing Sheets

SEAT RECLINER FOR VEHICLE

BACKGROUND OF THE INVENTION

This invention relates to a seat recliner for a vehicle for rotatably mounting a seat back as a backrest relative to a seat cushion as a seat face.

This type of seat recliner for vehicle includes a frame to be mounted on a base plate on a seat cushion side, for example. The seat recliner includes a lid to be mounted on an arm plate on a seat back side. The frame and the lid are made rotatable relatively to each other. An external gear (teeth) of a locking-member on the frame is engaged with (i.e. meshed with) an internal gear on an inner peripheral face of the lid. This engagement prevents relative rotation of the frame and the lid, thereby supporting the seat back in a position at a given angle. In this concern, see Japanese Unexamined Patent Publications No. 2002-10847 and No. 2002-291563, for example.

In the frame, a pivot and a guide are provided in the vicinity of the internal gear. The locking-member has a recessed bearing, which is slidably engaged with the pivot. The locking-member has an arcuate retaining face, which slidably abuts on a guide face of the guide and is coaxial with the bearing. The guide face is formed from the vicinity of the internal gear toward the inside of the internal gear, into an arc shape which is coaxial with the pivot. The inside of the internal gear includes a cam plate for driving the locking-member outward, so as to engage the external gear with the internal gear.

SUMMARY OF THE INVENTION

In the seat recliner, however, force acts on the guide face in a diagonal inside position from the internal gear through the locking-member. This action allows force from the internal gear in a tangent line direction of an arc extending along the internal gear, and force heading for the center of the arc, i.e., inward force toward the inside of the internal gear to act on the locking-member. The force in the tangent line direction can be balanced by the reaction from the guide face. The inward force, however, cannot be balanced only by the friction between the guide face and the retaining face which is pressed on the guide face. Therefore, force pressing the cam plate inward inevitably occurs.

The cam plate contacts with the locking-member in a state of line contact. When the inward force acts, the cam plate and the locking-member in the contact portion is subjected to large elastic deformation. This elastic deformation reduces an engagement depth between the internal gear and the external gear, and lowers coupling strength attributable to this engagement.

An object of this invention is to provide a seat recliner for a vehicle that enhances the coupling strength between an internal gear of a lid and teeth of a locking-member.

The invention is drawn to a seat recliner with the following features. The seat recliner includes a base mounted to a first seat member. The seat recliner includes a gear mounted to a second seat member and being rotatable relative to the base. The gear has first teeth along a peripheral face of the gear. The seat recliner includes a locking member movable inside of the first teeth. The locking member has second teeth engageable with the first teeth. The seat recliner includes a cam configured to rotate the locking member to engage the first and second teeth with each other for establishing an angle between the first and second seat members.

The seat recliner includes a guide on the base and having a guide face for slidably guiding the locking member to engage the first and second teeth with each other. The guide extends radially from a vicinity of the first teeth to a vicinity of the cam. A near side of the guide relative to the first teeth and the locking member define a gap therebetween.

Preferably, an action line is normal to a gear face of a second tooth of the locking-member at the furthest position from the guide. The gap extends radially inside of a position where the action line crosses the guide.

Preferably, the locking member is rotatably supported by a pivot on the base. The locking member has an arced outer peripheral part. The outer peripheral part is slidably supported by the guide face of the guide for engaging the first and second teeth with each other.

Preferably, the locking member is slidably supported by guide faces of a pair of guides parallel to each other for engaging the first and second teeth with each other. One of the locking member and the guides has a recess.

Preferably, the gap extends radially inward from a vicinity of the first teeth. The guide has an end at a near side of the guide relative to the first teeth. The gap has a gap portion between the end and an outer peripheral face of the locking-member opposite to each other. The gap portion is narrower than another gap portion.

Preferably, the end of the guide has an end face configured to abut against the locking member. The end face is inclined radially outward relative to a direction of moving the locking member guided by the guide face.

Preferably, the base has a pivot in a vicinity of the first gear. The pivot and the guide have the second teeth of the locking member interposed therebetween. The pivot functions as a fulcrum of the locking member.

Preferably, an action line is normal to a gear face of a second tooth of the locking member at the furthest position from the guide. The gap extends radially inward from a vicinity of the first teeth to a position where the action line crosses the guide.

BRIEF DESCRIPTION OF THE ACCOMPANYING DRAWINGS

DETAILED DESCRIPTION OF THE PREFERRED EMBODIMENTS

Figure 1:
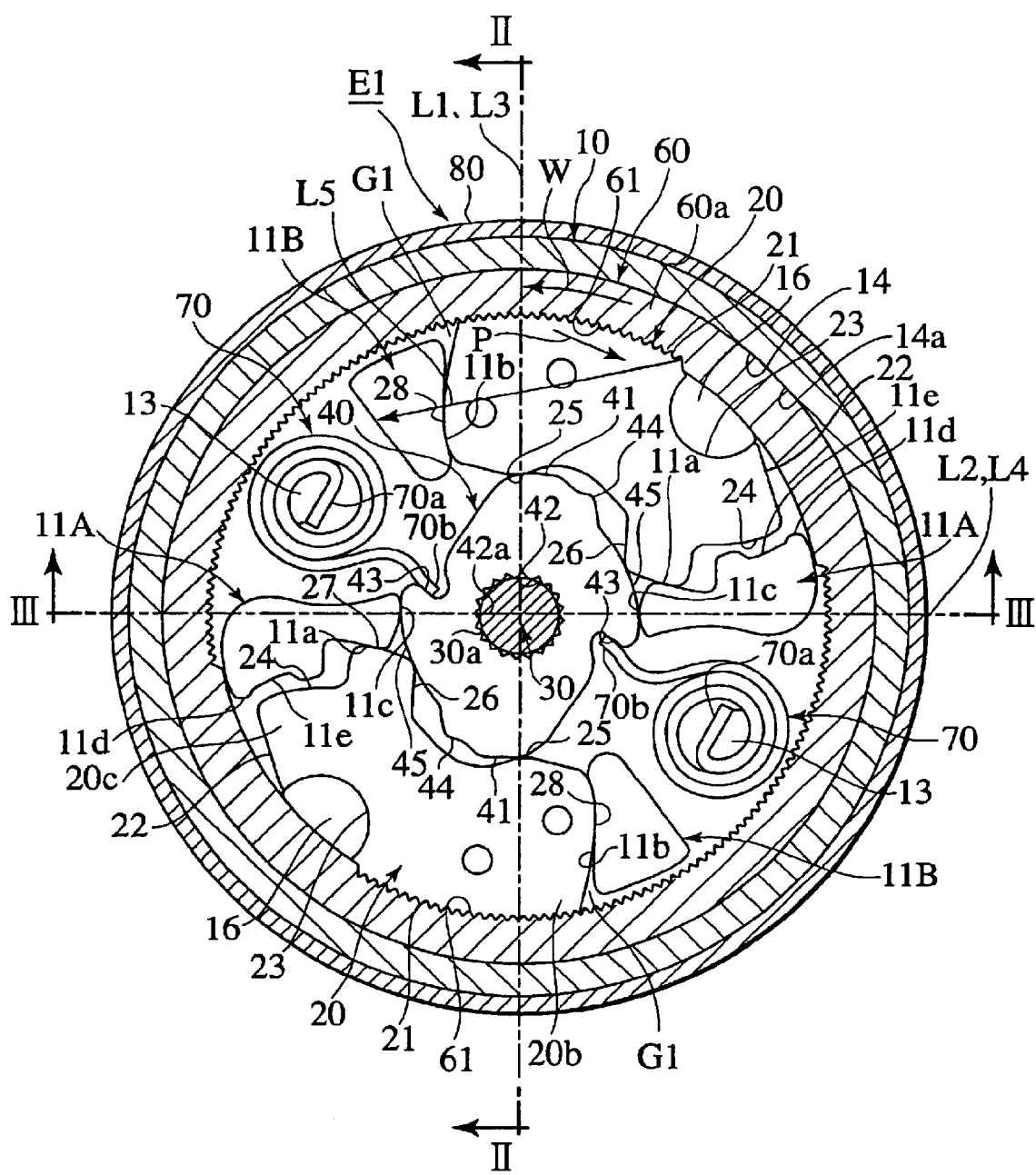
FIG. 1 is a front view of substantial part of a seat recliner for a vehicle according to a first embodiment.

Hereinafter, embodiments of this invention will be described based on examples and with reference to FIGS. 1 to 20.

First Embodiment

A seat recliner for vehicle E1 of a first embodiment will be described with reference to FIGS. 1 to 11. Seat recliner E1 includes a lid 60 which is fitted to the inner face of a circular recess 14 of a frame 10. The lid 60 is coaxially rotatable along the inner peripheral face of recess 14. Seat recliner E1 includes swingable or pivotable locking-members 20 and a rotatable cam plate or a cam 40. They 20, 40 are disposed between frame 10 and lid 60 in an axial direction.

The lid 60 includes internal gears 61 in two mutually opposite positions along an inner peripheral face thereof. The locking-members 20 are mounted to frame 10 at two locations of frame 10 to rotate on pivots 16. Locking-members 20 include external gears (teeth) 21 positioned to face the respective internal gears 61. The external gears (teeth) 21 can mesh with internal gears 61. Cam plate 40 pivotally rotates about a hole 42 at the rotation canter of this cam plate 40 in a first direction or counterclockwise. This rotation allows the cam plate 40 to push each of two locking-members 20 outward in a radial direction, and allows external gears 21 to mesh with internal gears 61. The rotating of cam plate 40 in the opposite direction or clockwise releases the mesh.

Figure 7:
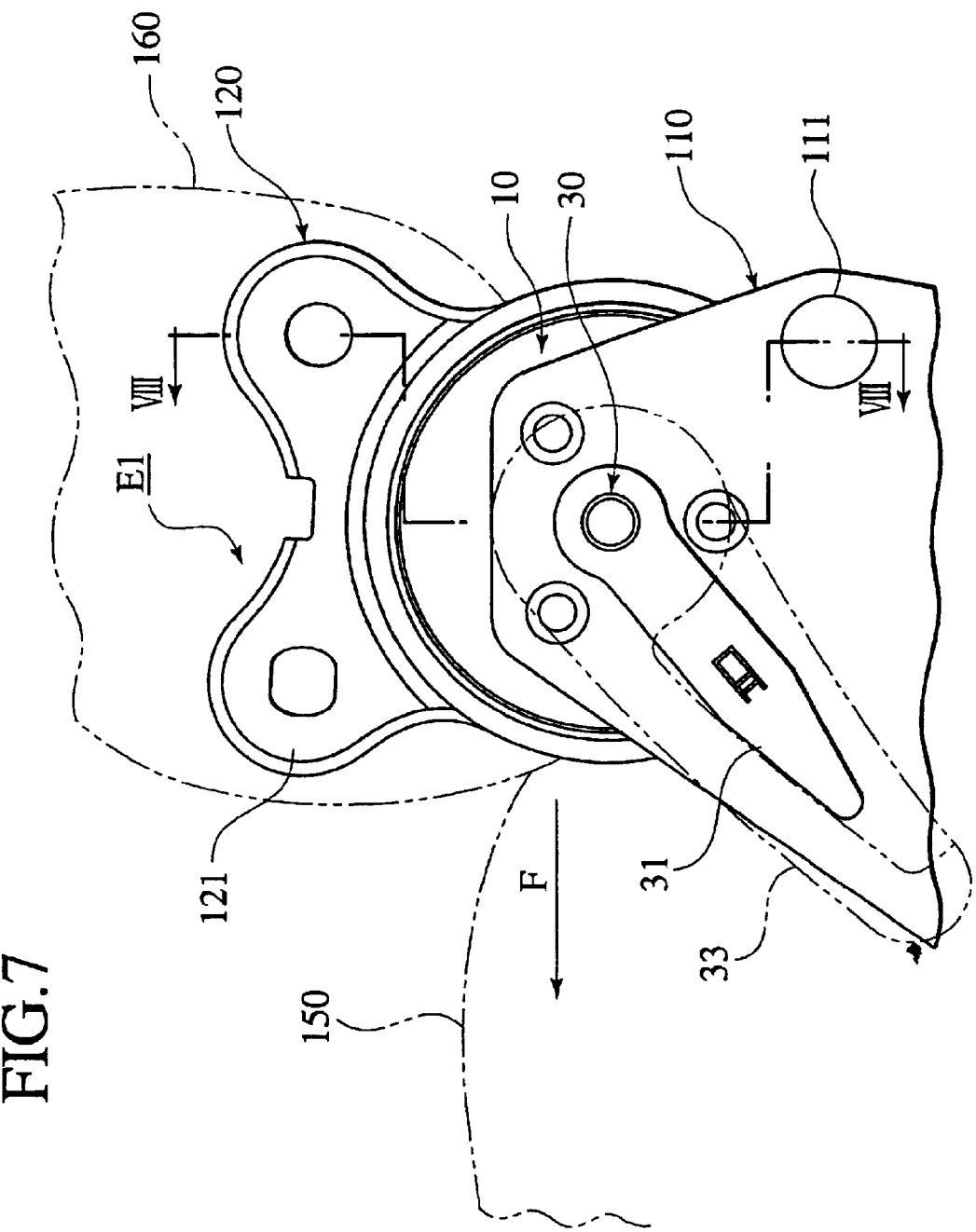
FIG. 7 is a front view of the seat recliner of FIG. 1.

One of frame 10 and lid 60 are joined to a seat cushion 150, while the other one thereof is joined to a seat back 160, as shown in FIG. 7. Meshing of external gears 21 of the locking-members 20 with internal gears 61 allows seat back 160 to be retained at a given angle with respect to seat cushion 150. In this embodiment, frames 10 are disposed in and fixed to seat back 150 at both of left and right ends in the transverse direction. Lids 60 are fixed to the seat back 160 at both of left and right ends in the transverse direction. Operation rods 30 on both of right and left are joined to tubular shaft 50, using serration (joint) 32 to be described later.

Figure 2:
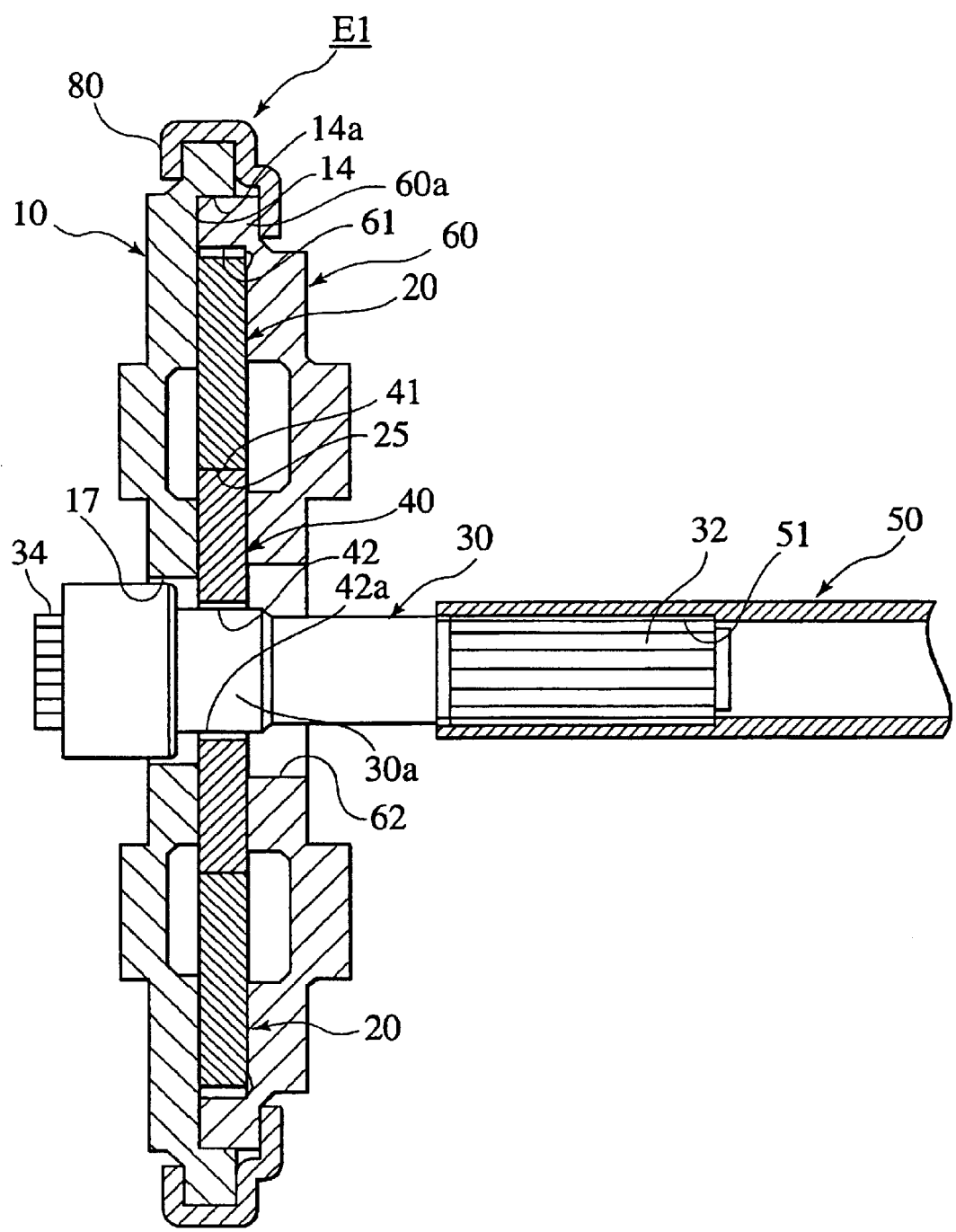
FIG. 2 is a cross-sectional view of the seat recliner taken along the II—II line in FIG. 1.
Figure 3:
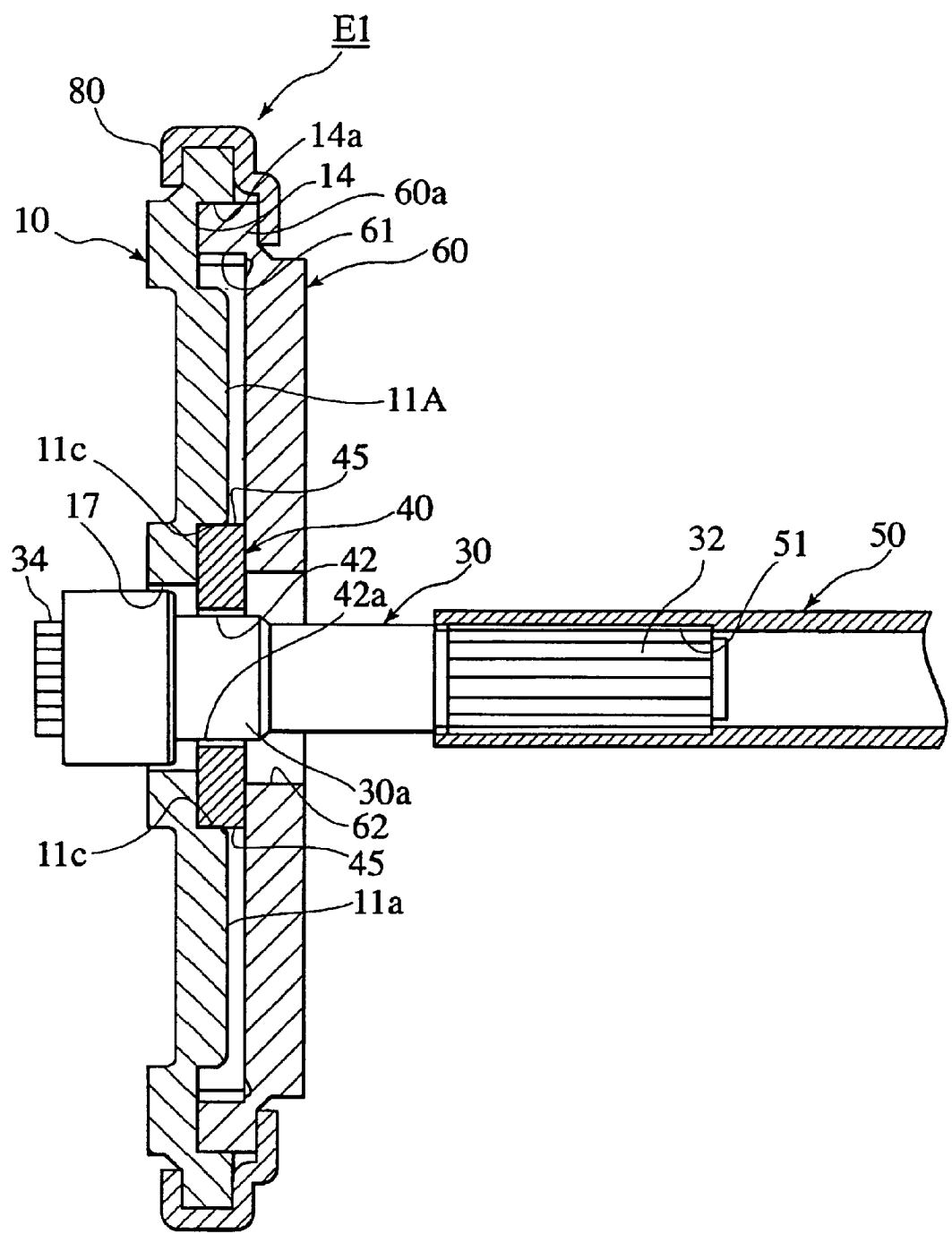
FIG. 3 is a cross-sectional view of the seat recliner taken along the III—III line in FIG. 1.

The operation rod 30 is pressed into the hole 42 of cam plate 40 for fixation, referred to FIGS. 2 and 3. The operation rod 30 includes serrations 32 and 34 for transmitting torque to and from outside. The serrations 32 and 34 are pressed into hole 42 of cam plate 40, with the angular position of the serrations 32 and 34 coinciding with the frame 10. Serration 32 is splined to serration (joint) 51 on the inner face of shaft 50. Serration 34 is splined to serration 35 formed on a joint hole of operation lever 31. Serrations 32 and 34 are identical in shape and location of projection and recess along the circumferential direction.

In FIG. 1, locking-members 20 include lock cam faces 41 angularly spaced to each other at 180 degrees positions in a circumferential direction of frame 10. The cam faces 41 are angularly spaced from each other at 180 degree positions about the rotation center of hole (rotating shaft) 42 of cam plate 40. The cam plate 40 is positioned on line L2 approximately orthogonal to line L1 connecting cam faces 41 with each other. The cam plate 40 includes restrict-outer peripheral faces 45 angularly spaced at 180 degrees positions about the rotation center of hole 42. Frame 10 includes first guide projections (guides) 11A to be described later, which are set in positions on line L4 approximately orthogonal to line L3 connecting cam faces 25 of locking-members 20. First guides 11A are angularly spaced from each other at 180 degree positions in the circumferential direction. The first guides 11A include respective slide surfaces 11c which slidably contact with corresponding outer peripheral faces 45 of cam plate 40. Each of the outer peripheral faces 45 is defined by an arcuately curved face about the rotation center of hole 42 of cam plate 40. A respective one of outer peripheral faces 45 normally slidably contacts with a corresponding one of slide surfaces 11c of first guides 11A, while the cam plate 40 rotates within an angular range. The slide surfaces 11c are shaped flat, and are approximately parallel to the line connecting cam faces 25 of locking-members 20. Slide surface 11c guides cam plate 40 to move toward each of cam faces 25.

The frame 10 includes semicylindrical pivots 16 which rotatably support locking-members 20 in the vicinities of internal gears 61. Each of the locking-members 20 includes a semicircular recessed bearing 23 which is rotatably engaged with pivot 16. Each of the locking-members 20 includes arced slide-retaining face 24 which is set in position on the opposite side of external gear 21 relative to bearing 23. The retaining face 24 is coaxial with bearing 23.

The frame 10 includes the first guide projections 11A which abut on and further retain retaining faces 24 under external force P. External force P is force attributable to relative rotating force between frame 10 and lid 60, which acts on pivots 16 through the meshed portion of internal gear 61 and external gear 21 and through locking-member 20.

The external force P is produced when force acts on seat back 160 to be moved backward.

The outer face of frame 10 is fixed to base plate 110 as a part of a reinforcement member of seat cushion 150, by welding or by use of bolts. An outer face of lid 60 is fixed to arm plate 120 as a part of a reinforcement member of seat back 160, by welding or by use of bolts. The frame 10 and lid 60 have spring 130 mounted coaxially therewith. The spring 130 biases against arm plate 120 in a front (F) direction to fall seat back 160 forward.

The frame 10 is formed into a discoid shape as a whole. Frame 10 includes a circular recess 14 coaxially formed with a circular inner peripheral face 14a in the vicinity of the outer periphery of frame 10. Frame 10 includes a rotation center hole 17 at the pivotal position for inserting operation rod 30 through hole 17.

Two first guide projections 11A, two second guide projections (slide guides) 11B, two projections 13, and two pivots 16 protrude from the bottom face of recess 14. The pivots 16 have semicircular outer peripheral faces engaged with semicircular bearings 23 of locking-members 20, thus rotatably supporting the locking-members 20. First guides 11A and second guides 11B are formed radially relative to the pivotal position in a region from the vicinity of internal gear 61 to the vicinity of cam plate 40. Each of the first guides 11A includes a guide face 11a that slidably guides the first outer peripheral face 27 of locking-member 20 rotatable about pivot 16. Similarly, each of second guides 11B includes a guide face 11b that slidably guides the second outer peripheral face (outer periphery) 28 of locking-member 20 rotatable about pivot 16. The first outer peripheral face 27 is positioned closer to the rotation center of frame 10 with respect to pivot 16. Here, the external force P hardly acts on guide face 11a. The first outer peripheral face 27 and guide face 11a guide looking-member 20 to be rotated about pivot 16 and also prevents locking-member 20 from dropping off from pivot 16.

The first outer peripheral face 27, second outer peripheral face 28, and guide faces 11a and 11b are formed into arc-shapes coaxial with the rotation center of locking-member 20 around pivot 16, that is, coaxial with bearing 23. The first guide 11A includes the slide face 11c directed to the rotation center. The first guide 11A includes back-up face 11d directed to slide-retaining face 24. The retaining face 24 and back-up face 11d are also formed into arc-shapes coaxial with bearing 23.

The second guide 11B has guide face 11b formed at the cam plate 40 side thereof, or at the near side of the second guide 11B relative to the cam plate 40. The guide face 11b has a recess formed at the internal gear 61 side thereof or at the near side of the guide face 11b relative to internal gear 61, with a gap G1 between the guide face 11b and the locking-member 20. This gap G1 is formed up to a radial inside position relative to a position where action line L5 and second guide 11B cross. The second guide 11B has guide face 11b inside thereof. The action line L5 is normal to the gear face of external gear 21 of locking-member 20 at the furthest position from second guide 11B.

The projections 13 are disposed in position between one first guide 11A and the other second guide 11B and in position between one first guide 11A and the other second guide 11B. The projections 13 retain bases 70a of locking springs 70

The locking springs 70 as spiral springs bias cam plate 40 to be rotated counterclockwise in FIG. 1. The cam plate 40 is biased to rotate counterclockwise by springs 70 and allows external gears 21 of locking-members 20 to mesh normally with internal gears 61.

The first guides 11A, second guides 11B, projections 13, and pivots 16 are integrally formed on frame 10, using embossing with a press machine.

The lid 60 is formed into a discoid shape similarly to frame 10. The lid 60 includes the internal gears 61 along the inner peripheral face of rim 60a that is rotatably fitted with the inner peripheral face 14a of frame 10. Lid 60 includes rotation center hole 62 at the pivotal position for inserting operation rod 30 therethrough.

The outer peripheries of lid 60 and frame 10 are covered and held by ring-shaped holder 80. The holder 80 retains lid 60 and frame 10 to be rotated relative to each other and not to be axially separated from each other.

The locking-member 20 includes the external gear 21 on one side of pivot 16 and at a portion opposed to internal gear 61. Locking-member 20 includes locked cam face 25 on the opposite side relative to the external gear 21. The locked cam face 25 receives force from locking cam face 41 of cam plate 40. Upon the receiving of the force from cam face 41 on cam face 25, locking-member 20 rotates clockwise about pivot 16. This rotation allows external gear 21 to be meshed with internal gear 61.

Figure 4:
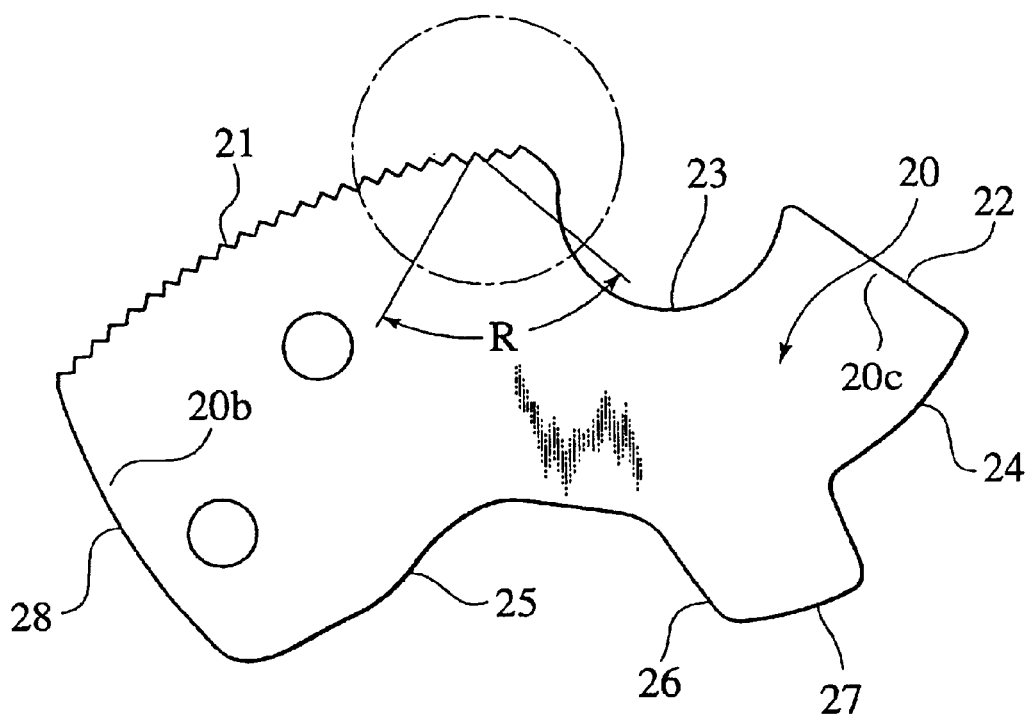
FIG. 4 is an enlarged front view of a locking-member in FIG. 1.
Figure 5:
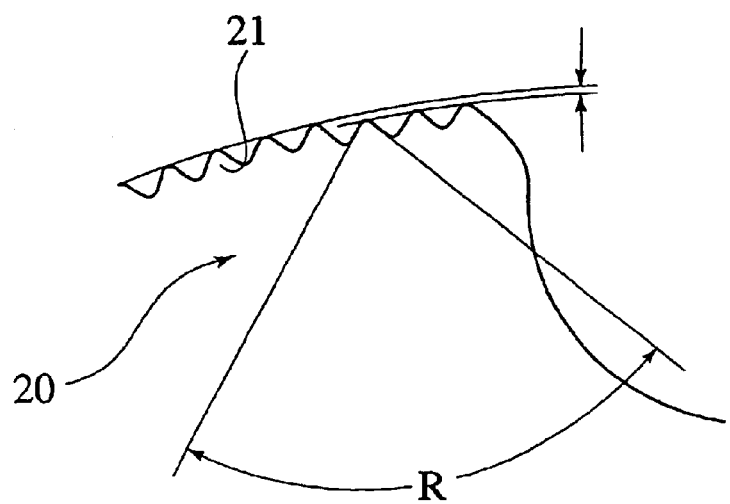
FIG. 5 is an enlarged view showing a portion surrounded by a one-dotted chain line in FIG. 4.
Figure 6:
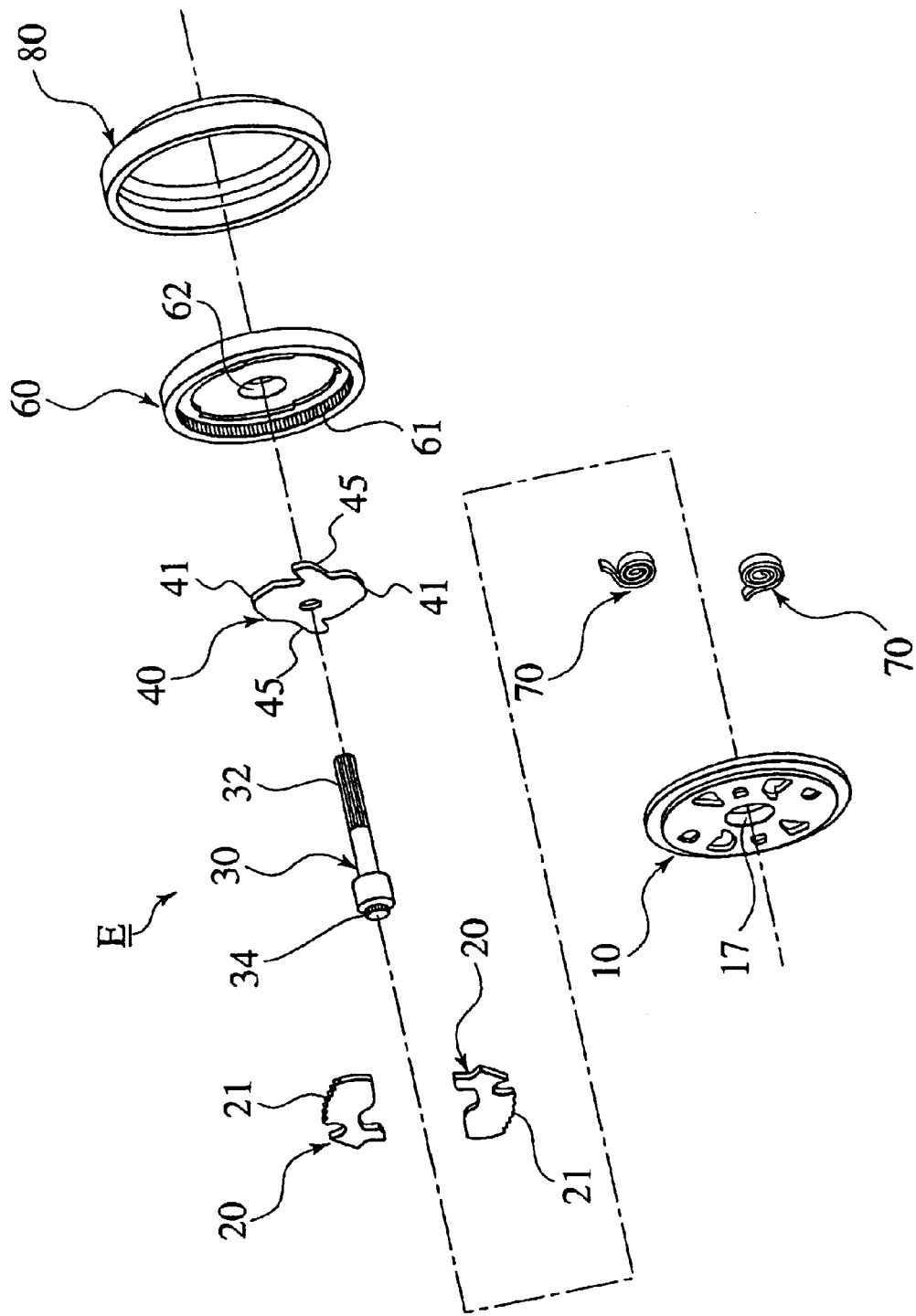
FIG. 6 is an exploded perspective view of substantial part of the seat recliner of FIG. 1.

The external gear 21 is formed up to a position proximate to pivot 16. The teeth of external gear 21 and internal gear 61 have pressure angles set at a range from 60° to 90°, respectively. In FIG. 4, the external gear 21 includes teeth at the near side thereof relative to pivot 16, with the heights lower than other teeth, and with the radius of the tip circle greater than that of other teeth.

The outer peripheral face 22 is located on the opposite side to external gear 21 relative to pivot 16. The outer peripheral face 22 is cut flatly so as not to contact with internal gear 61. The outer peripheral face 22 includes a lock-disengaged cam face 26 at the far side thereof relative to the internal gear 61. The cam face 26 receives force from lock-disengaging cam face 44 of cam plate 40. That is, upon receiving of the force from cam face 44 on cam face 26, locking-member 20 rotates counterclockwise. This rotation allows external gear 21 to be disengaged from internal gear 61

Figure 8:
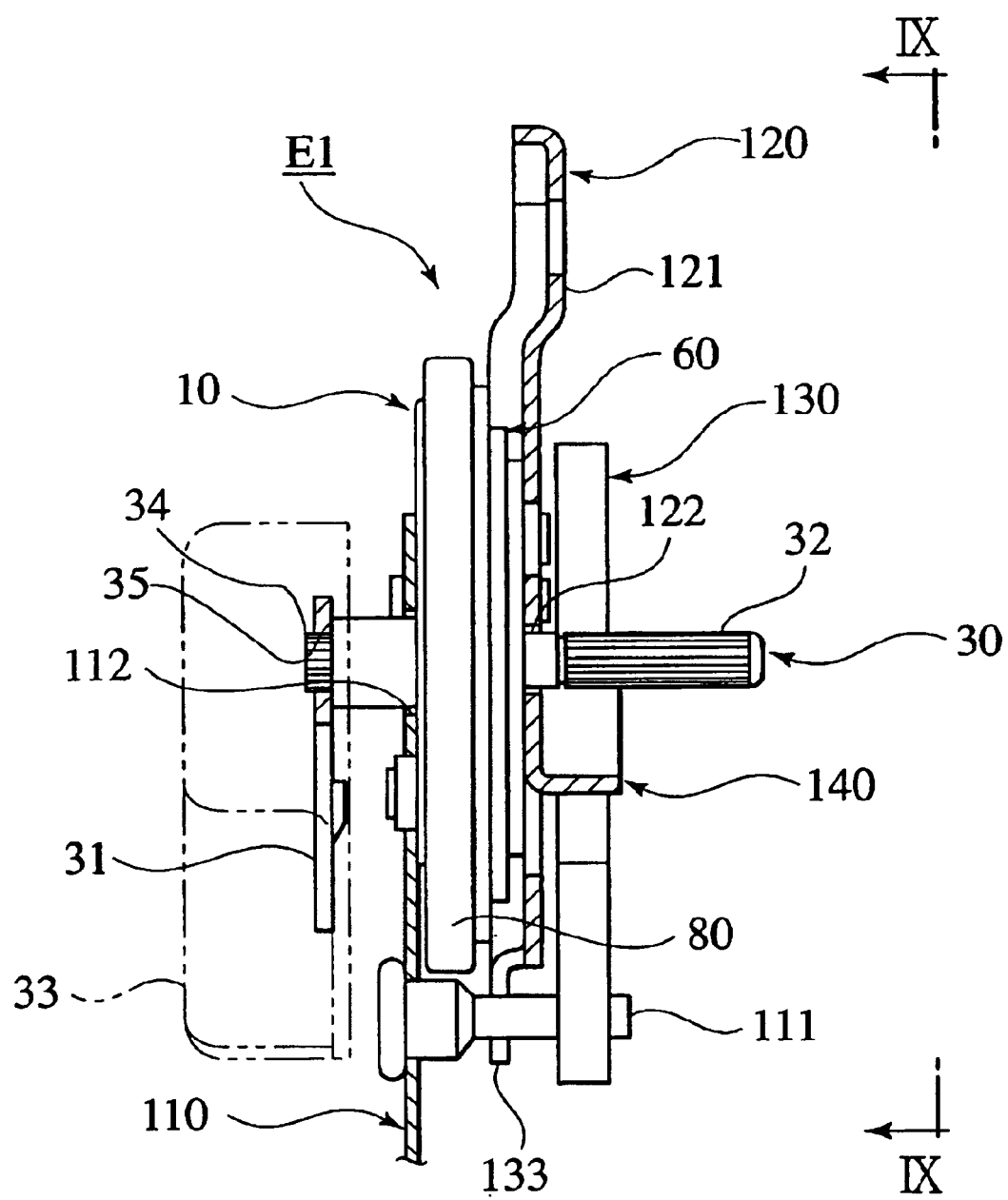
FIG. 8 is a sectional view of the seat recliner taken along the VIII—VIII line in FIG. 7.
Figure 9:
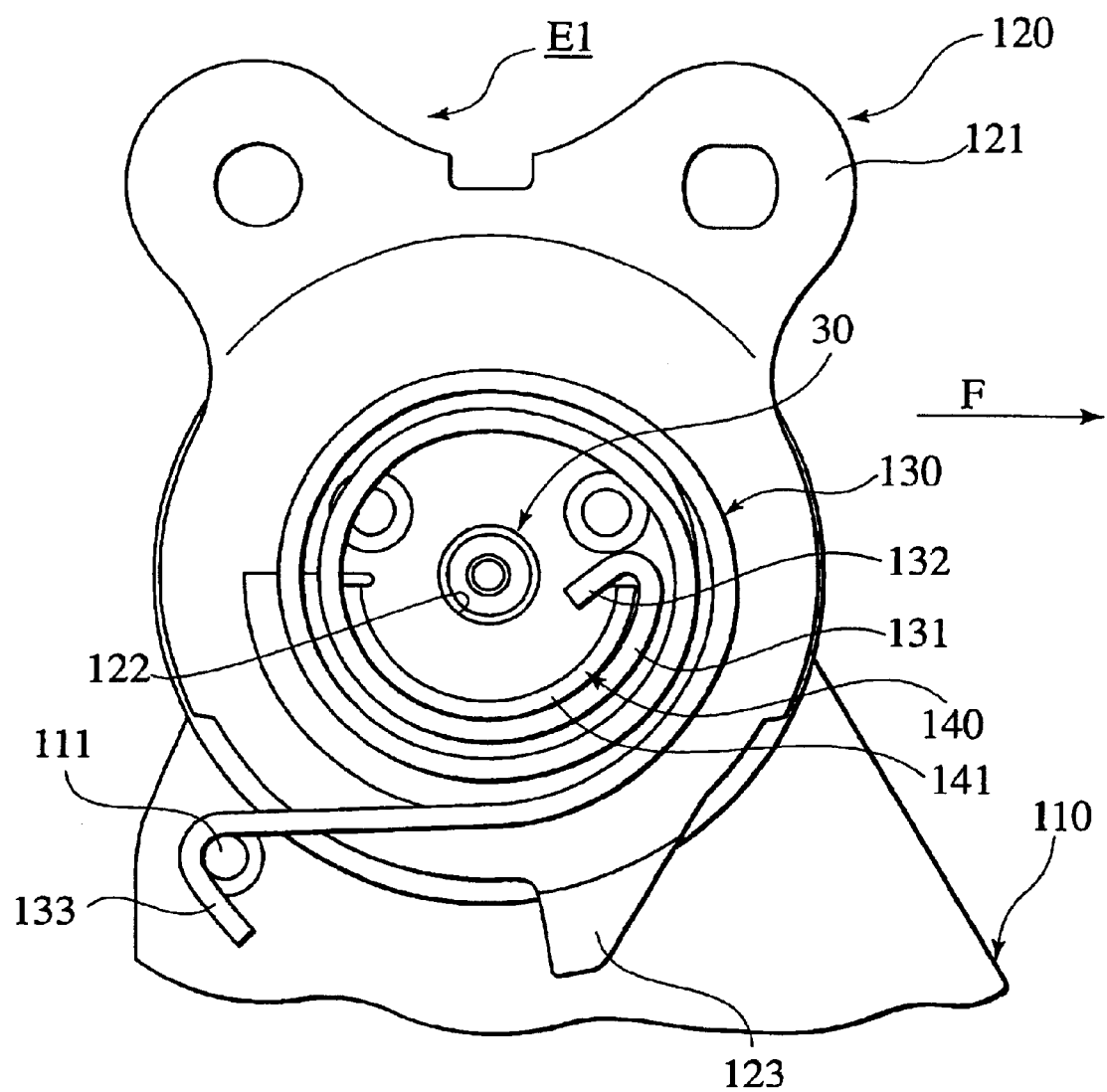
FIG. 9 is a view showing the seat recliner from the viewpoint indicated by the arrows IX—IX in FIG. 8.

In FIGS. 8 and 9, the operation rod 30 is loosely fitted into both center holes 17 and 62 of frame 10 and lid 60. The operation rod 30 is also inserted through support holes 112 and 122 formed on base plate 110 and arm plate 120, respectively, with allowance. Operation rod 30 includes serrations 34 and 32. The serration 34 protrudes outward from base plate 110. The serration 32 protrudes outward from arm plate 120. The operation lever 31 is attached to serration 35. The operation lever 31 has operation knob 33 attached thereto.

The cam plate 40 includes hole 42 at the rotation center, where pressure-insertion shaft 30a of operation rod 30 is pressed in for fixing cam plate 40. The cam plate 40 includes two cam faces 41 and two cam faces 44 in the outer peripheral face thereof. The outer peripheral face of cam plate 40 includes locking parts 43 where outside ends 70b of locking springs 70 are locked.

The locking spring 70 includes a spiral spring. The locking spring 70 includes base 70a that is retained by projection 13. The locking spring 70 includes outside end 70b that is locked with locking part 43 of cam plate 40. Locking spring 70 biases the cam plate 40 to be rotated counterclockwise in FIG. 1. The cam plate 40 efficiently receives the biasing force from two locking springs 70 in tangent line directions through locking parts 43 provided in two axially symmetric positions.

Next, operations and benefits of the seat recliner for vehicle E1 will be described.

Seat recliner E1 is assembled to a seat. Normally, as shown in FIG. 1, cam plate 40 rotates counterclockwise by locking springs 70 under biasing force. This rotation allows cam faces 41 to press on cam faces 25 of locking-members 20. This pressure allows locking-members 20 to be rotated clockwise on pivots 16. This rotation allows external gears 21 to be meshed with internal gears 61 of lid 60. This meshing prevents rotation of seat back 160. In this state, lines L1 and L2, and lines L3 and L4 substantially overlap one another, respectively, as shown in FIG. 1.

Meanwhile, operating of operation knob 33 of operation lever 31 allows operation rod 30 to be rotated clockwise. This rotation releases engagement between cam faces 41 of cam plate 40 and cam faces 25 of locking-members 20. Subsequently, cam faces 44 press against cam faces 26 of locking-members 20.

Accordingly, locking-members 20 rotate counterclockwise on pivots 16. This rotation releases the mesh between external gears 21 and internal gears 61 of lid 60, thus establishing an unlocked state. The arm plate 120 mounted to lid 60, that is, seat back 160 is rotated in the front (F) direction by spiral spring 130 under biasing force.

Next, this unlocked state is restored to a locked state. The operation knob 33, which is gripped to keep seat back 160 in a desired inclined position, is released. Next, locking springs 70 allows cam plate 40 to be rotated counterclockwise under biasing force. This rotation allows locking-members 20 to be rotated clockwise, and external gears 21 are meshed with internal gears 61, thus establishing the locked state.

Figure 10:
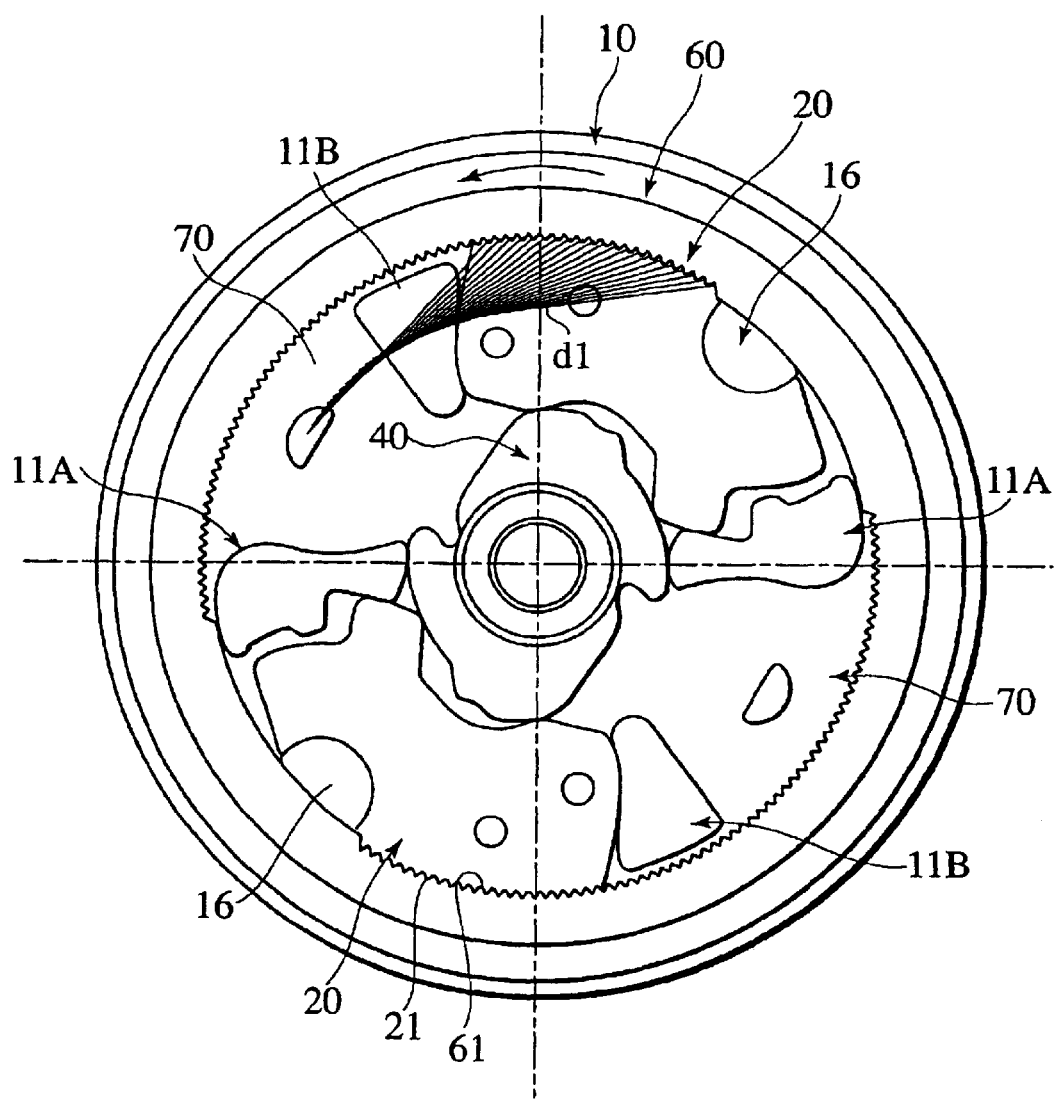
FIG. 10 is a view explaining force which acts on a locking-member from an internal gear in the seat recliner of FIG. 1, where d1 indicates directions of input.
Figure 11:
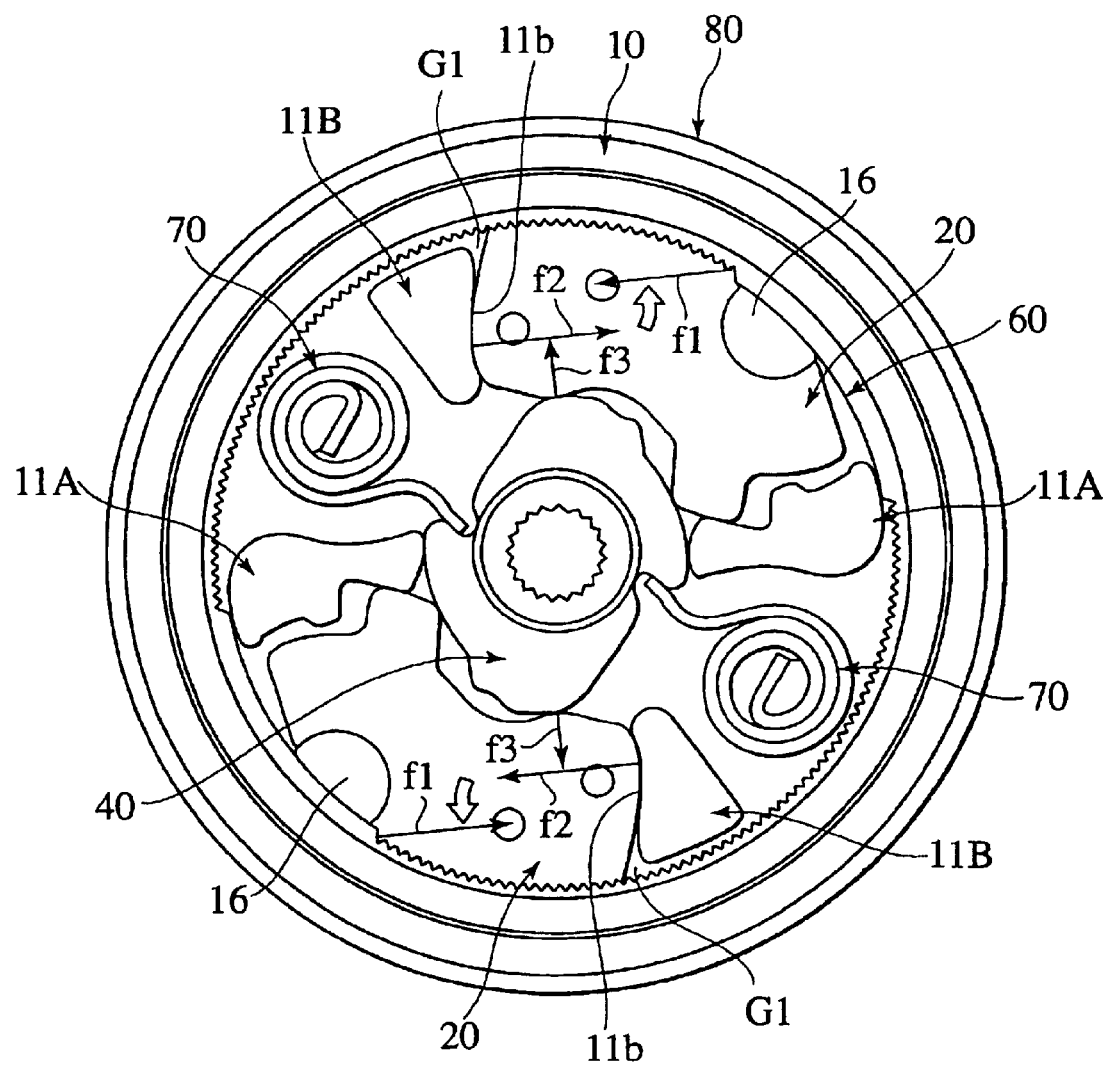
FIG. 11 is another view explaining the force which acts on the locking-member from the internal gear in the seat recliner of FIG. 1.
Figure 12:
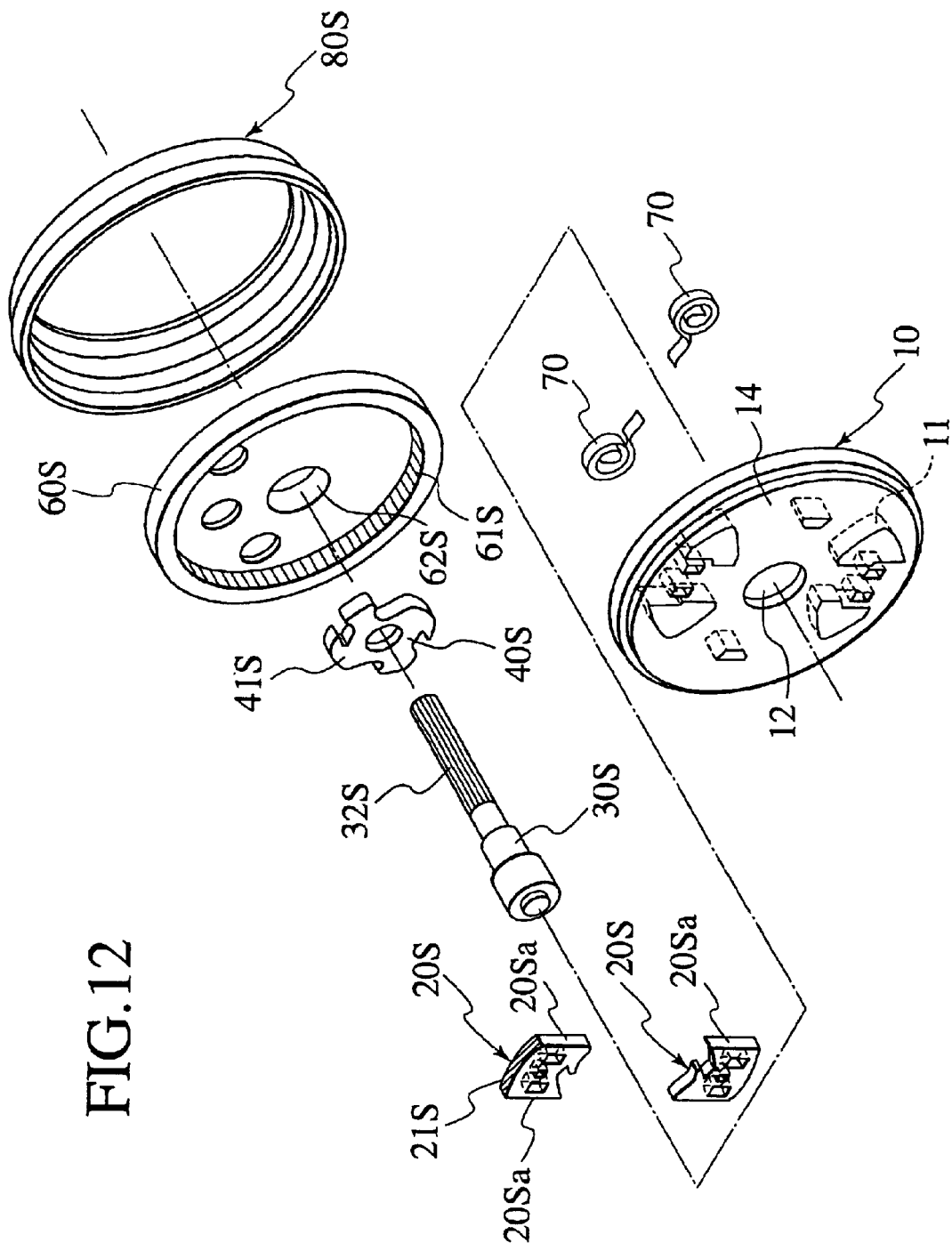
FIG. 12 is an exploded perspective view of a primary part of a seat recliner according to a second embodiment.

According to seat recliner E1, with teeth 21 engaged with internal gears 61, force W is applied to rotate frame 10 and lid 60 relative to each other. As shown in FIG. 10, the force acts on locking-member 20 in the direction d1 normal to a gear face of each of the meshed teeth. This force f1 acts on second guide 11B and cam plate 40 through locking-member 20. Therefore, as shown in FIG. 11, the force acts on locking-member 20 diagonally inward. Meanwhile, guide face 11b of second guide 11B abutting against locking-member 20 has a reaction f2 acting thereon normal to the guide face. Similarly, the cam face of cam plate 40 abutting against locking-member 20 has a reaction f3 acting thereon normal to the tangent line.

The force f1 acting on locking-member 20 is balanced with the reaction f2 acting on the guide face of second guide 11B and the reaction f3 acting on cam plate 40. The gap G1 is provided between the near side of second guide 11B relative to internal gear 61 and the locking-member 20. The direction of the force f1 acting on locking-member 20 and the direction of the force f2 acting on guide face 11b of the slide guide are offset. This offset allows a moment on the second guide 11B in a rotational direction to act on locking-member 20. The moment is directed to mesh teeth 21 of locking-member 20 and internal gear 61 with each other. The moment is directed in an outward direction away from the cam plate 40.

The force acting on cam plate 40 by locking-member 20 is reduced by the degree equivalent to the outward force. This reduces deformation of a contact portion between cam plate 40 and locking-member 20.

Therefore, it is possible to prevent engagement depth between internal gear 61 and teeth 21 of locking-member 20 from being reduced as much as possible. This improves coupling strength between internal gear 61 and teeth 21.

In particular, action line L5 of the force f1 from internal gear 61 acts in the direction normal to the gear face of teeth 21 of locking-member 20 at the furthest position from second guide 11B. Inside of a crossing of action line L5 and second guide 11B, guide face 11b is formed. At the internal gear side with respect to the position or the crossing, a gap G1 is formed between second outer peripheral face 28 of locking-member 20 and second guide 11B. Therefore, the reaction acting on guide face 11b and the reaction acting on locking-member 20 are offset without intersection as shown in FIG. 11. This offset enables the moment acting on locking-member 20 to be amplified, and distributed force directed outward from internal gear 61 is amplified. This further enhances coupling strength between internal gear 61 and teeth 21 of locking-member 20.

Second Embodiment

Next, a second embodiment of this invention will be described with reference to FIGS. 12 to 15.

As shown in FIGS. 12 to 15, seat recliner E2 includes a discoid frame 10S, for example. Seat recliner E2 includes a lid 60S which has an outer peripheral face that covers the inner face of circular recess 14S formed on frame 10S, and that is rotatable along the inner peripheral face of frame 10S. The lid 60s includes an internal gear 61S on the inner peripheral face thereof. The outer peripheries of frame 10S and lid 60S are covered and held by ring-shaped cover 80S. In this way, frame 10S and lid 60S are joined to be rotatable relative to each other.

Seat recliner E2 includes a locking mechanism 100S. Locking mechanism 100S includes locking-members 20S which are disposed on the inner face of frame 10S for sliding in the radial direction of frame 10S. Locking-members 20S can mesh with internal gear 61S of lid 60S. Locking mechanism 100S includes operation rod 30S which rotatably supports frame 10S and lid 60S at the centers thereof. Locking mechanism 100S includes an operation lever which is integrally mounted on operation rod 30S. Locking mechanism 100S includes a cam plate or a cam 40S which moves locking-members 20S in a radial direction by rotation of the operation lever. Locking mechanism 100S includes locking springs 70S which normally bias locking-members 20S toward the outer periphery.

Locking-members 20S are meshed with internal gear 61S by use of biasing force of locking springs 70S, and relative rotation between frame 10S and lid 60S is prevented. Rotation of operation rod 30S (clockwise in FIG. 13) allows locking-members 20S to be pulled inward by cam plate 40S for unlocking. In this way, frame 10S and lid 60S can freely rotate relative to each other.

Figure 13:
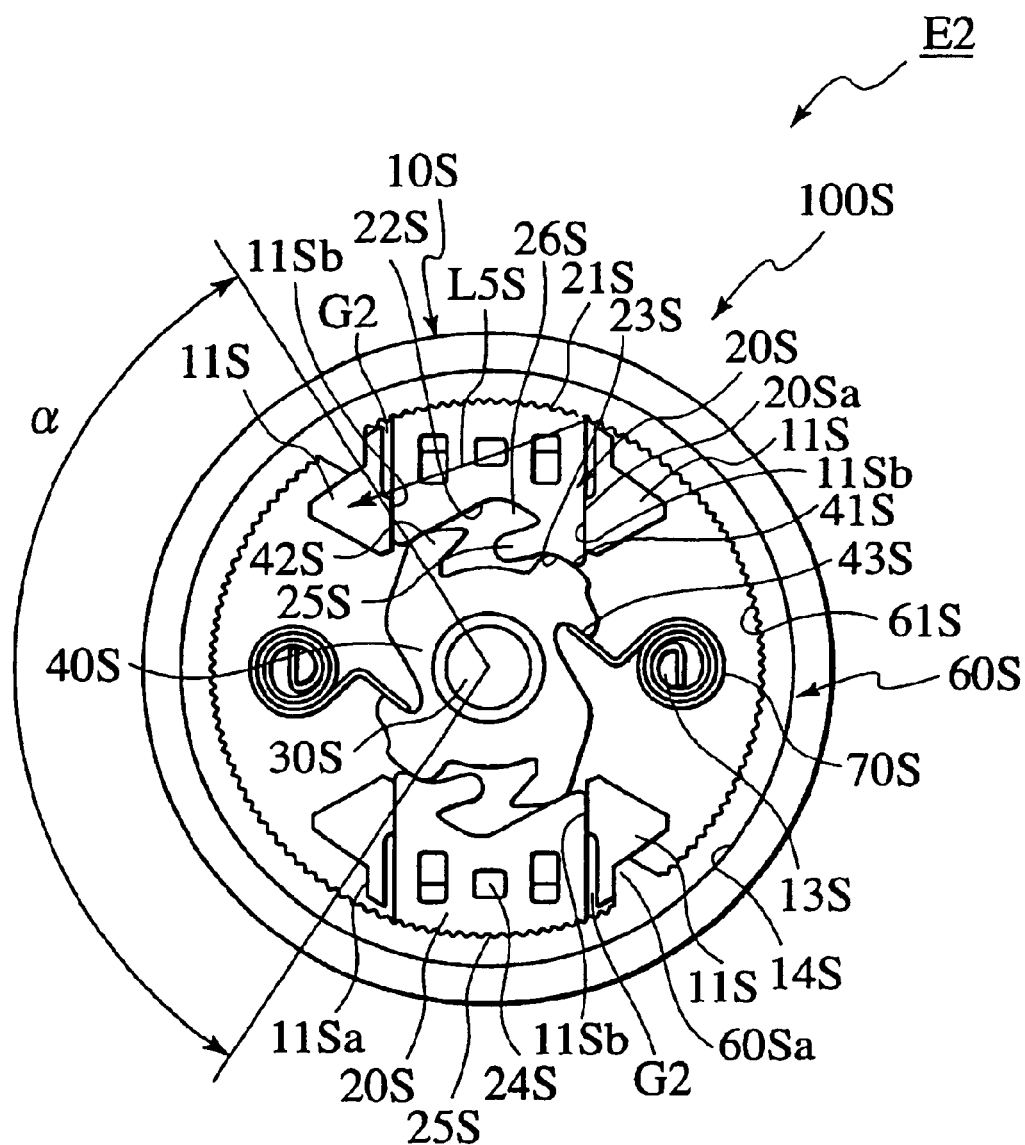
FIG. 13 is a front view of the primary part of the seat recliner shown in FIG. 12.
Figure 14:
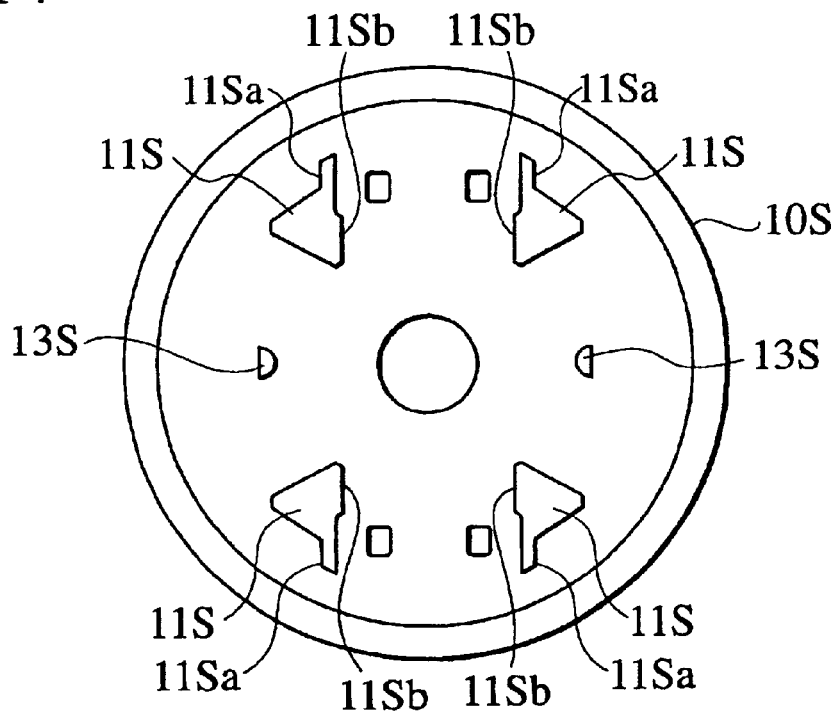
FIG. 14 is a front view of a frame shown in FIG. 12.
Figure 15:
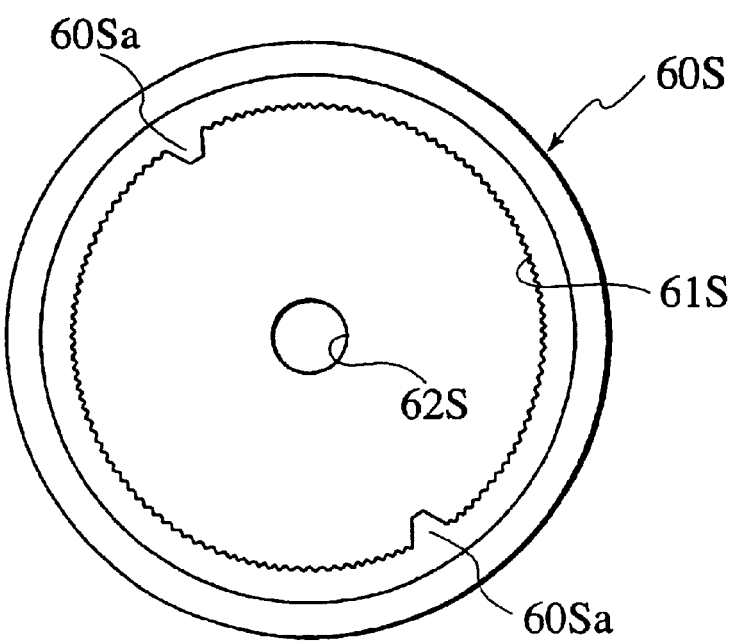
FIG. 15 is a front view of a lid shown in FIG. 12.

Describing locking mechanism 100S in more detail with reference to FIG. 13, at least one locking-member 20S, for example, two locking-members 20S are disposed opposite to each other in the diametrical direction on the inner face of frame 10S. The guides (slide guides) 11S for each locking-member 20S include a pair of guide faces 11Sb that are radially formed inside frame 10S. The locking-member 20S is slidably fitted into a space between the pair of guide faces 11Sb toward the operation rod 30S. The guides 11S are formed by mounding (so-called embossing) the inner bottom face of frame 10S. Recesses 11Sa are formed on respective outer sides of the heads of a pair of guides 11S opposed to the circumference.

The outer peripheral face of locking-member 20S has arcuate external gear (teeth) 21S formed thereon, which is meshed with internal gear 61S of lid 60S. The end face of locking-member 20S on the opposite side to the gear includes tapered face 22S. The one end of locking-member 20S has projection 25S formed thereon. The tapered face 22S and projection 25S has a groove 26S formed therebetween.

The pair of guides 11S is formed in a region from the vicinity of internal gear 61S to the vicinity of cam plate 40S, radially from the pivotal position.

Each of the pair of guides 11S includes guide face 11Sb at the cam plate 40S side, or at the near side of guide 11S relative to the cam plate 40S. Guide 11S includes a recess at the internal gear 61S side, or at the near side of guide 11S relative to the internal gear 61S, so as to provide a gap G2 between locking-member 20S and guide 11S. Guide 11S slidably supports right and left side faces (outer peripheries) 20Sa of locking-member 20S. This gap G2 is formed up to an inside position relative to a position where action line L5S and one of guides 11S cross. Action line L5S has a direction which is normal to the gear face of external gear 21S of locking-member 20S at the furthest position from the one of guides 11S. Guide face 11Sb of the other guide 11S is similarly formed.

This gap G2 may be provided only to the guide on which a load acts when a force acts on a seat back to be reclined backward.

The operation rod 30S is loosely inserted through holes 12S and 62S formed in the centers of frame 10S and lid 60S, respectively. The operation rod 30S is loosely fitted and inserted into support holes 112S and 122S formed on base plate 110S and arm plate 120S, respectively. The operation rod 30S includes a portion protruding outward from base plate 110S, to which operation lever 31S is mounted. The operation rod 30S includes a portion protruding outward from arm plate 120S, on which spline 32S for connecting locks on both sides is formed. The operation lever 31S has operation knob 33S mounted thereto.

The cam plate 40S is pressed in and fixed to the intermediate portion of operation rod 30S. The cam plate 40S includes outer peripheral ends formed with cam faces 41S. The cam face 41S is engaged with engaging parts 23S formed on the end face of locking-member 20S on the opposite side to the gear for pressing of locking-member 20S outward. The cam face 41S includes other outer peripheral ends formed with projections 42S. The projection 42S presses projection 25S of locking-member 20S to be unlocked in a direction. The cam plate 40S has locking parts 43S formed thereon. The locking parts 43S lock the two outer ends of locking springs 70S. The locking springs 70s have bases mounted to two projections 13S formed inside frame 10S. Locking parts 43S are biased to normally press locking-members 20S outward.

The lid 60S is fitted into a recess 14S formed inside frame 10S. The Lid 60S is disposed between the inner curved face of recess 14S and the outer peripheral face of lid 60S and is rotatable relatively to frame 10S. Lid 60S includes a circular recess having an inner peripheral face. This inner peripheral face includes a ring-shaped internal gear 61S meshable with external gear 21S of locking-member 20S.

According to locking mechanism 100S, locking-members 20S are pressed outward by coaction of locking springs 70S and cam plate 40S. The external gear 21S of locking-members 20S is meshed with internal gear 61S of lid 60S, thus locking lid 60S in rotation. In this locked state, operation rod 30S is rotated clockwise in FIG. 13. This rotation allows the cam faces 41S of cam plate 40S to disengage from the locking parts 23S of locking-members 20S. The projections 42S of cam plate 40S slide on tapered faces 22S of locking-members 20S to enter into the groove 26S of locking-member 20S. Thereafter, the projection 42S press down projections 25S of locking-members 20S, and locking-members 20S thereby moves toward the center. The mesh between the external gear 21S of locking-members 20S and the internal gear 61S of lid 60S is released, thus unlocking lid 60S.

With the teeth 21S engaged with the internal gear 61S, force acts on frame 10S and lid 60S, which are rotated relative to each other. The force acts on guide face 11Sb of one of guides 11S diagonally inward from internal gear 61S through locking-member 20S. The force acts on the locking-member 20S in a direction normal to a gear face of each of the meshed teeth. This force acts on guides 11S and cam plate 40S through locking-member 20S.

In this case, similarly to the first embodiment, the force acting on locking-member 20S is balanced by a reaction acting on guide face 11Sb and a reaction acting on cam plate 40S.

The recess is provided at the near side of guide 11S relative to the internal gear, and the gap G2 is thereby provided between the locking-member 20S and guide 11S. This gap G2 allows the direction of the force acting on locking-member 20S and the direction of the force acting on guide face 11Sb to be offset. The offset allows a moment on the guide 11S in the rotational direction to be exerted on locking-member 20S. The moment is directed to mesh external gear 21S with internal gear 61S. The moment is directed to the direction apart from the cam plate 40S.

The force acting on cam plate 40S by locking-member 20S is reduced by the degree equivalent to the outward force. This reduces deformation of a contact portion between cam plate 40S and locking-member 20S.

Therefore, it is possible to prevent an engagement depth of internal gear 61S and teeth 21S of locking-member 20S from being reduced as much as possible. This improves coupling strength between internal gear 61S and teeth 21S.

In particular, action line L5S of the force from internal gear 61S acts in the direction normal to the gear face of teeth 21S of locking-member 20S at the furthest position from one of guides 11S. The guide face 11Sb is formed at an inside position relative to a position where action line L5S and the guide 11S cross. Therefore, the reaction acting on guide face 11Sb and the reaction acting on locking-member 20S are offset without intersection. This offset enables the moment acting on locking-member 20S to be amplified, thus amplifying the force directed outward from internal gear 61S. This further enhances coupling strength between internal gear 61S and teeth 21S of locking-member 20S.

When a force for rotating of frame 10S and lid 60S relative to each other acts on guide face 11Sb of the other guide 11S, the benefits are identical to those of guide face 11Sb of the one of guides 11S.

Third Embodiment

Seat recliner for vehicle E3 according to a third embodiment will be described with reference to FIGS. 16 to 20.

Figure 16:
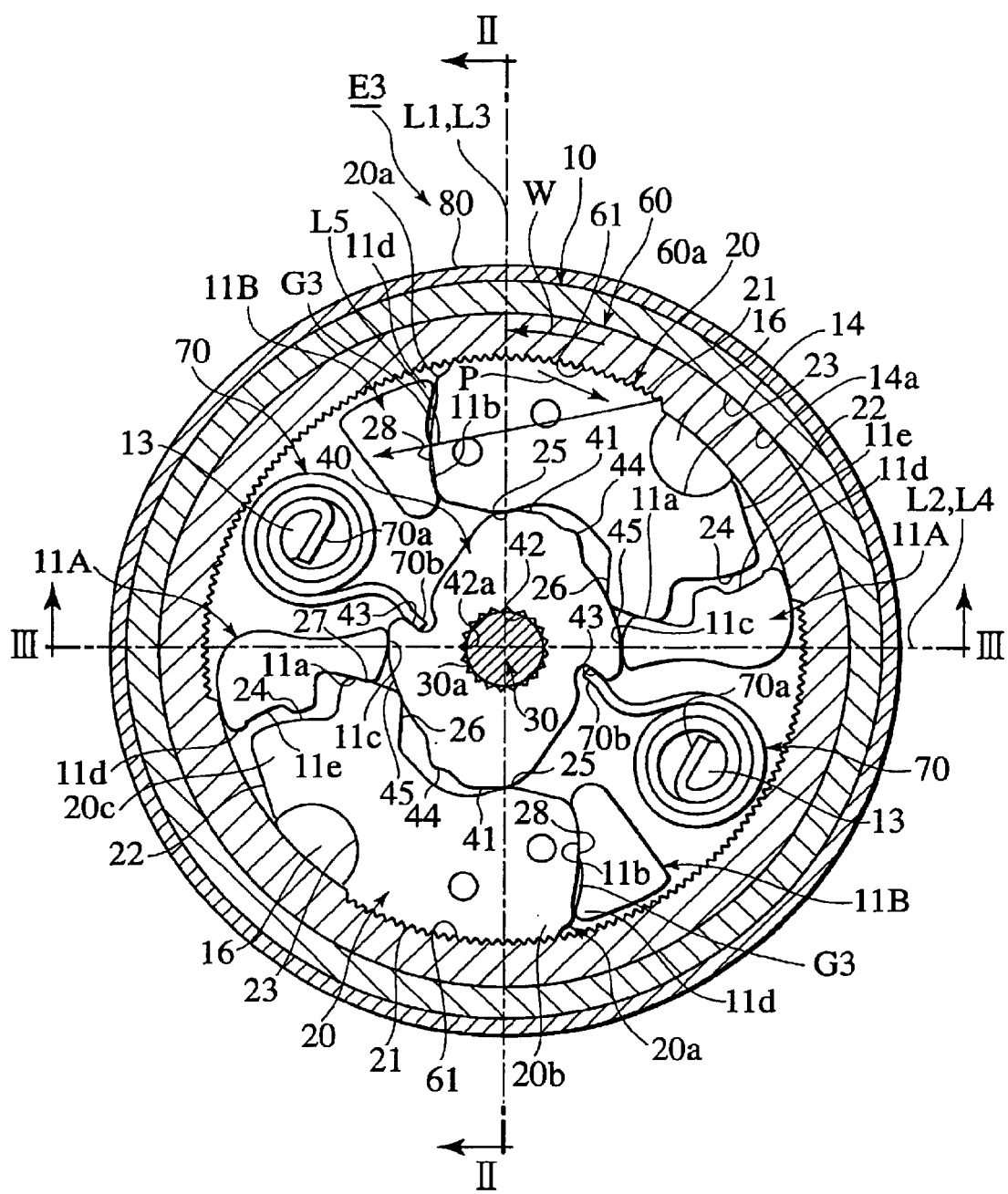
FIG. 16 is a front explanatory view showing a primary part of a seat recliner for a vehicle according to a third embodiment.

Referring to FIG. 16, the second guide projection 11B has a guide face 11b formed at the cam plate 40 side, or at the near side of the second guide projection 11B relative to the cam plate 40. The second guide projection 11B has a recess formed at the internal gear 61 side, or at the near side of the second guide projection 11B relative to the internal gear 61, so as to secure a gap G3 of about 0.6 to 1.3 mm between locking-member 20 and second guide projection 11B. This gap G3 is formed up to an inside position in the radial direction relative to a position where an action line L5 and second guide projection 11B cross. The second guide 11B has guide face 11b formed inside thereof. The action line L5 is normal to the gear face of external gear 21 of locking-member 20 at the furthest position from second guide 11B.

Figure 17:
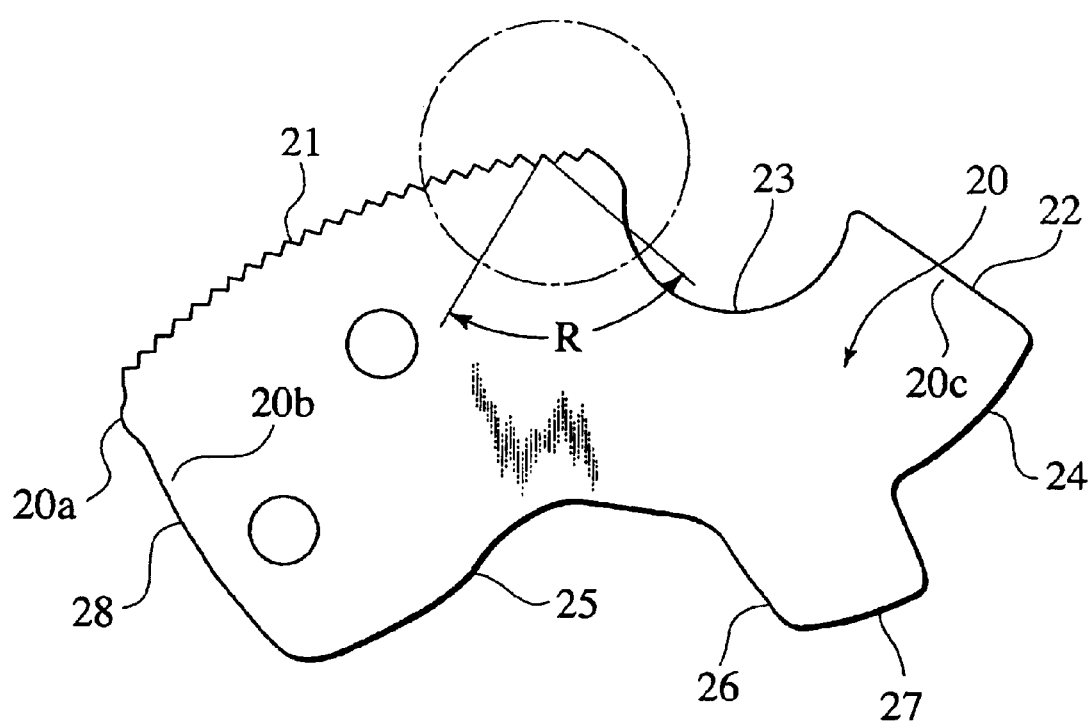
FIG. 17 is an enlarged front explanatory view of a locking-member shown in FIG. 16.

The external gear 21 side of second outer peripheral face 28 of locking-member 20, or the near side of the face 28 relative to the external gear 21, has projection 20a located opposite to the internal gear 61 side of end 11d of second guide 11B, or the near side of end 11d relative to the internal gear 61, as seen in FIG. 17.

The projection 20a and end 11d of second guide 11B has a slight clearance of about 0.2 to 0.5 mm therebetween. With external gear 21 is meshed with internal gear 61, a force (load) acts on frame 10 and lid 60 to be rotated relative to each other while exceeding a given value (about 1000 to 2000 N∃m, for example). The action allows projection 20a of locking-member 20 to abut against the end lid of second guide 11B located opposite thereto.

Here, second guide 11B includes end 11d at the internal gear 61 side, or at the near side of the second guide 11B relative to the internal gear 61. The end 11d is located opposite to projection 20a of locking-member 20. As shown in FIG. 16, the end face of end 11d abutting against locking-member 20 is inclined outward in the radial direction with respect to a moving direction of locking-member 20 guided by guide face 11b.

When this load becomes greater, this projection 20a bites end 11d of second guide projection 11B located opposite thereto.

Next, operations, benefits and the like of seat recliner for vehicle E3 will be described.

Figure 18:
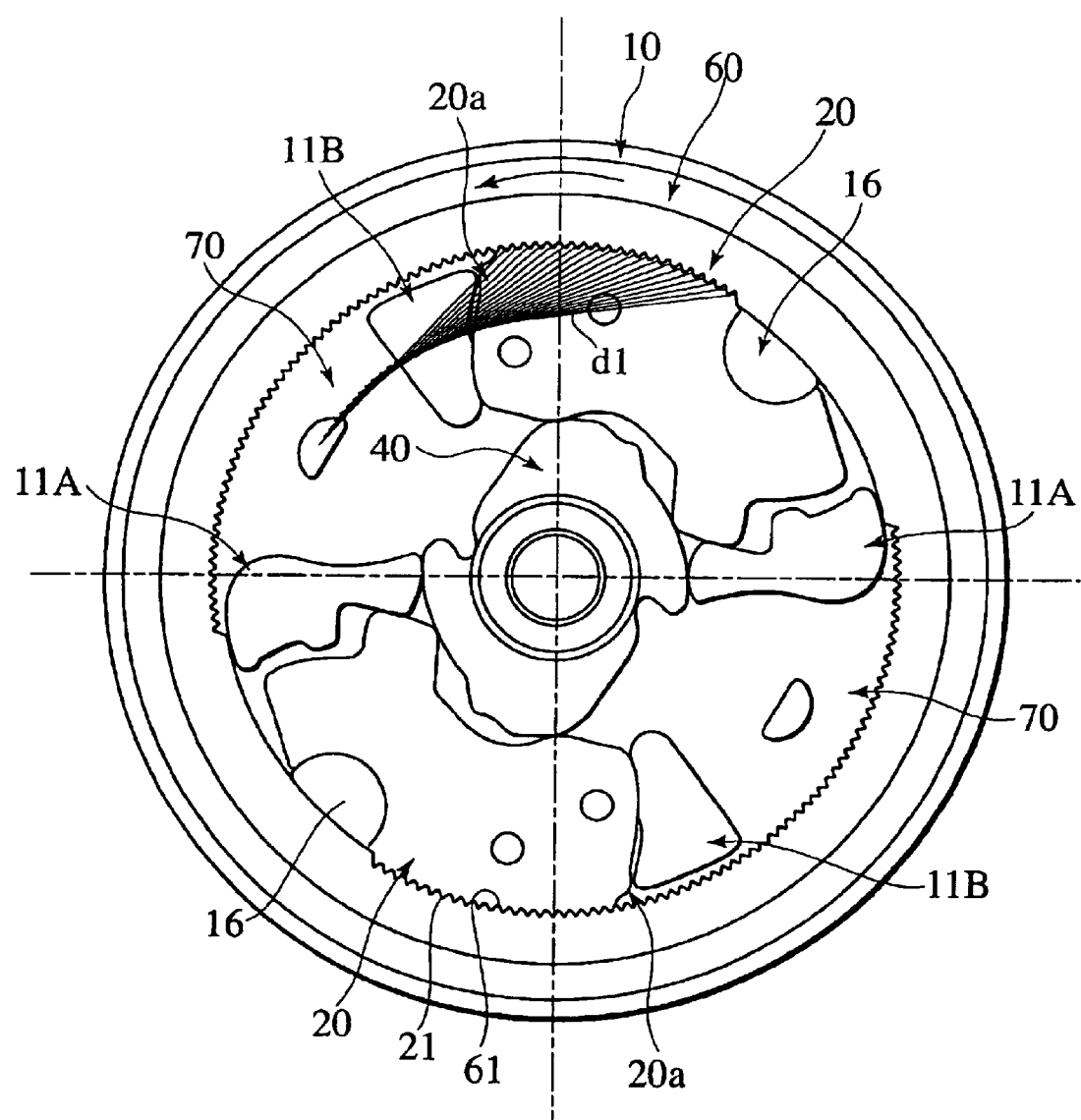
FIG. 18 is a view explaining force which acts on the locking-member from an internal gear in the seat recliner of FIG. 16, where d1 indicates directions of input.

With external gear 21 is engaged with internal gear 61, a load due to a front collision of a vehicle acts a seat back to be moved forward. The load induces force W acting on the frame 10 and lid 60 to be rotated relative to each other. In this event, as shown in FIG. 18, a force acts on locking-member 20 in a direction normal to the gear face of each tooth of meshed external gear 21. This force acts on second guide 11B and cam plate 40 through locking-member 20.

Figure 19:
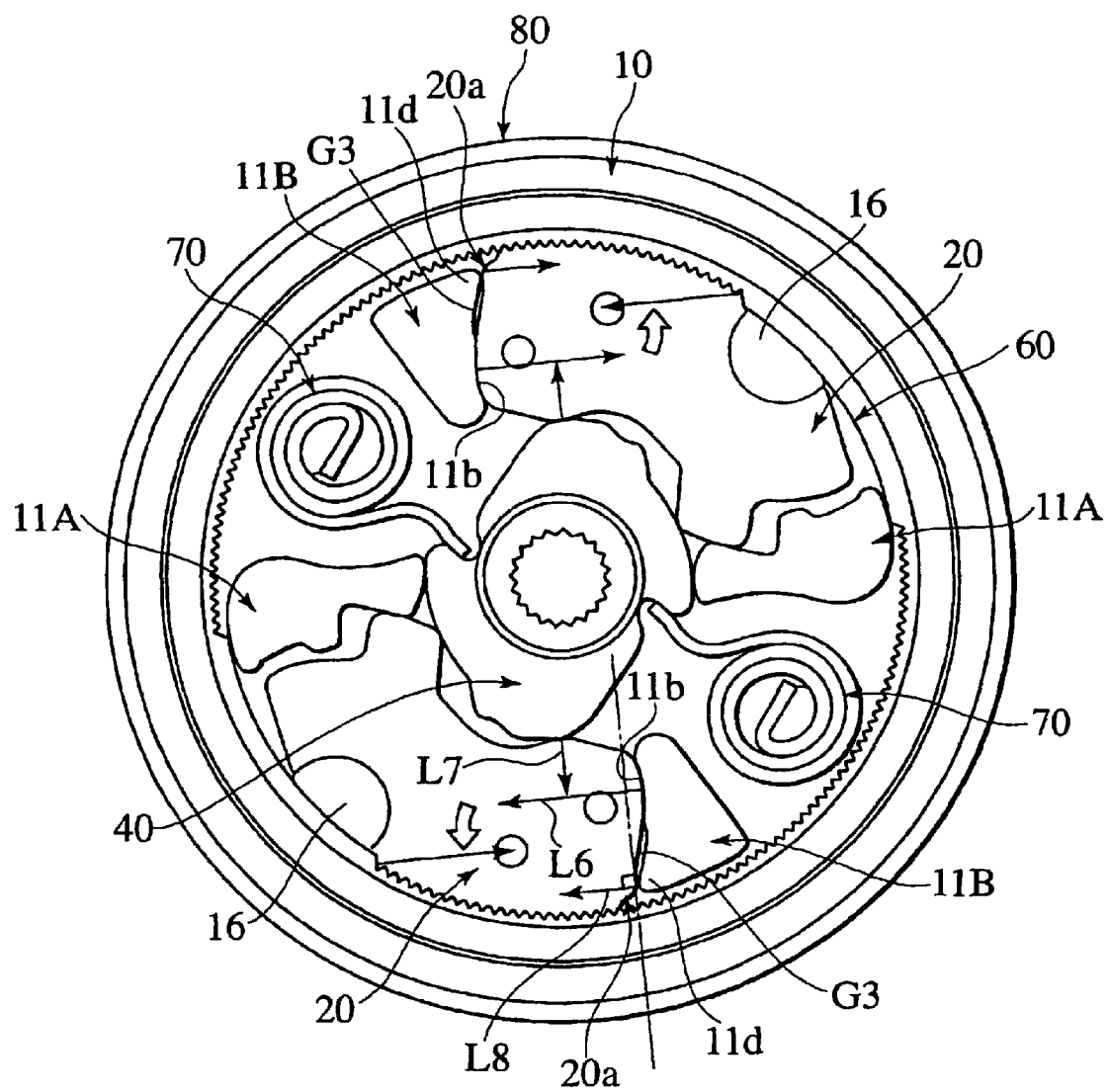
FIG. 19 is another view explaining the force which acts on the locking-member from the internal gear in the seat recliner of FIG. 16.

In response to the force thus inputted, guide face 11b of second guide 11B and lock cam face 41 have normal reactions L6 and L7 thereon, respectively, as shown in FIG. 19. By this reaction, locking-member 20 is retained in a locked state without disengagement.

Here, projection 20a of locking-member 20 does not abut on end 11d of second guide 11B located opposite thereto. Guide face 11b of second guide 11B is offset at a position with respect to the inputted force. Therefore, the locking-member 20 has a moment acting on locking-member 20 in a direction to mesh the external gear 21 and internal gear 61 with each other. This moment can reinforce the mesh and also reduce the force acting on cam plate 40.

When the inputted force grows, the guide face 11b of second guide 11B starts deformation. In this event, the supporting of locking-member 20 on the pivot 16 prevents locking-member 20 from rotating by itself on lock cam face 41 as a fulcrum. Instead, locking-member 20 is pushed to moves toward the second guide 11B side while maintaining the mesh. This force (load) over the given value allows the projection 20a of locking-member 20 to abut against the opposite end 11d of second guide 11B.

For this reason, the end 11d of second guide 11B abutting against locking-member 20 has reaction L8 acting in the normal direction to end 11d as shown in FIG. 19.

In this way, the reaction resists against the force acting on locking-member 20 diagonally inward. The second outer peripheral face 28 and projection 20a of locking-member 20 contact guide face 11b and end 11d of second guide 11B, respectively. The reaction acts on guide face 11b and end 11d of second guide 11B diagonally outward. Similarly, the reaction also acts on the cam face of cam plate 40 abutting against locking-member 20 in the direction normal to this tangent line.

The force acting on locking-member 20 is balanced by the reaction acting on guide face 11b and end 11d of second guide projection 11B and the reaction acting on cam plate 40.

Providing the gap G3 between second guide 11B and locking-member 20 allows the direction of the force acting on locking-member 20 and the direction of the force acting on guide face 11b of second guide 11B to be offset. The offset allows a moment to act on locking-member 20 in the direction of rotation on the second guide 11B side as a fulcrum.

The moment in a direction allows external gear 21 of locking-member 20 to mesh with internal gear 61. The moment is directed outwardly away from the cam plate 40 side of locking-member 20.

The force acting on cam plate 40 by locking-member 20 is reduced by the degree equivalent to the outward force. This reduces deformation of a contact portion of cam plate 40 and locking-member 20.

An amplification of the force acting on locking-member 20 inward allows the projection 20a to be pressed against guide face 11b of second guide 11B. This pressure contact allows projection 20a to bite this guide face 11b. The reaction on guide face 11b bitten by projection 20a acts diagonally outward.

Here, locking-member 20 is rotatably supported by pivot 16. By this support, locking-member 20 does not rotate on the engagement part with cam plate 40 in an inclined position. Locking-member 20 presses against second guide 11B approximately in a parallel direction (which is actually the circumferential direction centered at the cam plate 40).

The end 11d has a smaller area which is subjected to this pressure. Accordingly, reaction L8 acting on end 11d becomes smaller than reaction L6 acting on guide face 11b. For this reason, the moment on end 11d of guide face 11b in opposition to the gap G3 acts on locking-member 20 outward. This action reduces the force pressing locking-member 20 down toward cam plate 40.

The end 11d of second guide 11B includes a contact face with projection 20a of the opposite locking-member 20. This contact face is inclined outward in the radial direction with respect to the moving direction of locking-member 20 guided by guide face 11b. By the inclination, when projection 20a of locking-member 20 presses on end 11d, force does not act in a direction to push locking-member 20 down and inward in the radial direction. Thus, the end 11d functions to prevent locking-member 20 from moving inward. This reduces the force acting on cam plate 40.

When the force acting on locking-member 20 is amplified, enlargement of the contact face of second guide projection 11B with locking-member 20 in area reduces a surface pressure. The reduction of the surface pressure reduces deformation of second guide projection 11B. The reduction of the surface pressure also reduces the load acting on cam plate 40 to relieve deformation of the locking part of cam plate 40 with locking-member 20. This retains the mesh between external gear 21 of locking-member 20 and internal gear 61, thus enhancing locking strength.

Further, an amplification of the force acting on locking-member 20 eliminates a gap between second outer peripheral face 28 of locking-member 20 and second guide 11B. The entire opposed face of second guide projection 11B can receive locking-member 20. Moreover, projection 20a bites end 11d of second guide 11B completely. Even when entire second guide 11B receives second outer peripheral face 28 of locking-member 20, the force pressing locking-member 20 down toward cam plate 40 is not amplified.

In this way, the range of the contact face of second guide projection 11B abutting against locking-member 20 is changed depending on the force acting on locking-member 20 in magnitude to adjust the balance in strength between second guide projection 11B and cam plate 40. This considerably enhances the locking strength.

Therefore, the embodiment securely prevents the reduction of an engagement depth between internal gear 61 and external gear 21. This further enhances the coupling strength between internal gear 61 and external gear 21, regarding seat recliner for vehicle E of a belt-in-seat type which can bear against a strong force toward the front of the vehicle.

The action line L5 of the force from internal gear 61 acts in a direction approximately normal to the gear face of external gear 21 of locking-member 20 at the furthest position from second guide projection 11B. This gap G3 is located between the guide face 11b of second guide projection 11B and the second outer peripheral face 28 of locking-member 20. The gap G3 is formed from a position where the action line L5 cross the second guide 11B, up to a radial outside position where projection 20a is provided in a projecting manner, that is, to a position where the projection 20a is opposed to the internal gear 61 side of the second guide projection 11B or the near side of second guide projection 11B relative to the internal gear 61. The reaction acting on guide face 11b and the reaction acting on locking-member 20 are offset without intersection. This offset enables the moment acting on locking-member 20 to be amplified, and a force acting on external gear 21 outward toward the internal gear 61 side is amplified. This further enhances the coupling strength between the internal gear 61 and the external gear 21 of locking-member 20.

Figure 20:
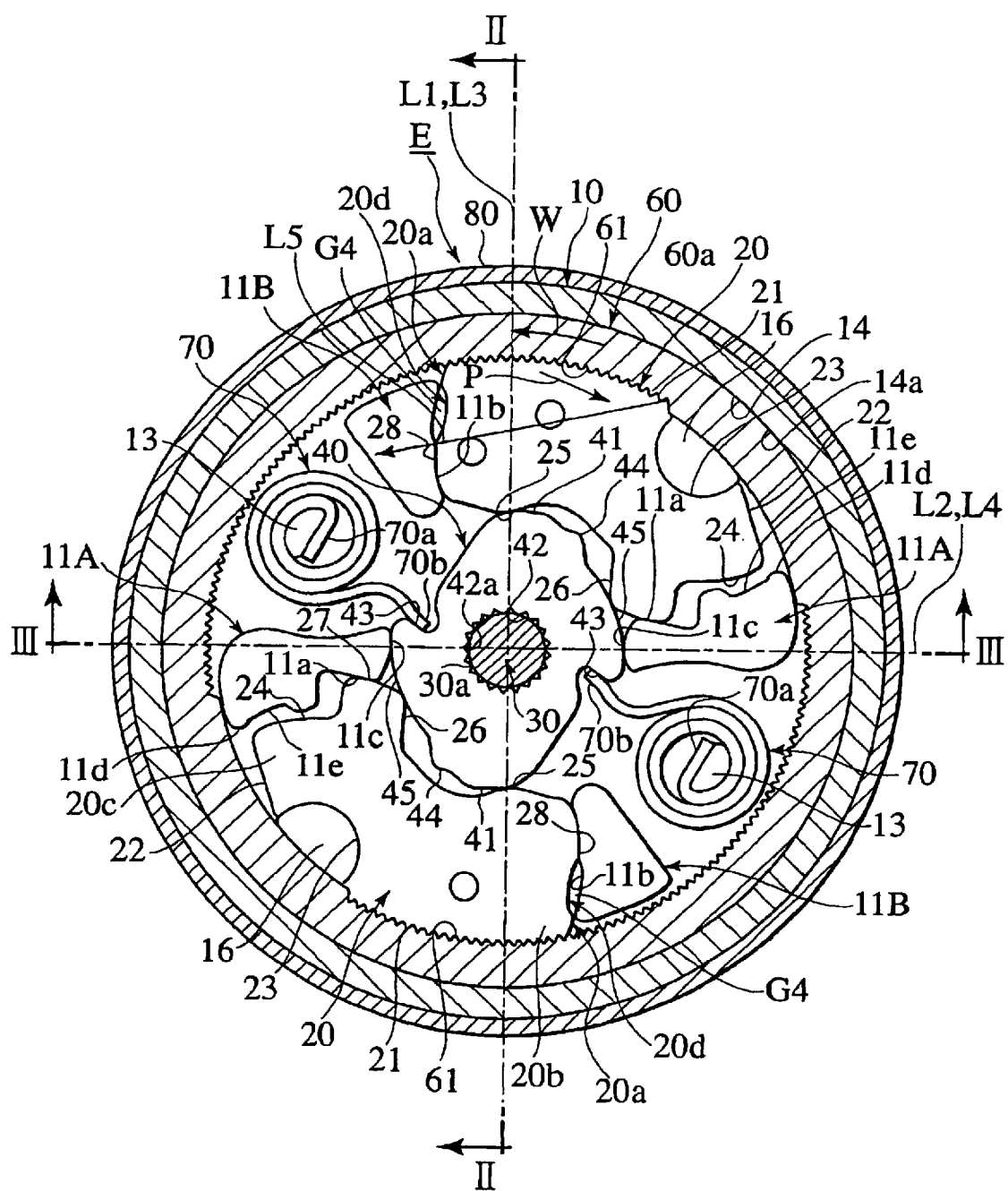
FIG. 20 is a front view showing a primary part of a seat recliner according to another embodiment.

In this embodiment, the external gear 21 side of the second outer peripheral face 28 of locking-member 20 has projection 20a opposed to the internal gear 61 side of the guide face 11b of second guide 11B. Instead, as shown in FIG. 20 where the identical reference numerals are designated to the elements corresponding to those in FIG. 16, the external gear 21 side of the second outer peripheral face 28 of locking-member 20 may have recess 20d that is opposed to the internal gear 61 side of guide face 11b of second guide projection 11B.

The providing of this recess 20d forms the gap G4 between second guide projection 11B and locking-member 20. The recess 20d allows formation of projection 20a opposed to the internal gear 61 side of second guide 11B on the external gear 21 side of the second outer peripheral face 28 of locking-member 20.

The providing of the gap G4 between second guide 11B and locking-member 20 allows the direction of the force acting on locking-member 20 and the direction of the force acting on guide face 11b of second guide projection 11B to be offset. This embodiment advantageously obtains substantially the identical benefits as those of the foregoing embodiments.

The entire contents of Japanese Patent Applications P2002-289224 (filed Oct. 1, 2002) and P2003-157193 (filed Jun. 2, 2003) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

According to the invention, with second teeth of a locking-member engaged with first teeth of a gear, a force is applied to rotate the gear and a base relative to each other. The force acts on locking-member in the direction normal to a gear face of each of the meshed second teeth. This force acts on a guide and a cam through the locking-member. Therefore, the force acts on the locking-member diagonally inward. Meanwhile, the guide face of the guide abutting against the locking-member has a reaction acting threreon normal to a guide face. Similarly, the cam face of the cam abutting against the locking-member has a reaction acting thereon normal to the tangent line.

The force acting on the locking-member is balanced by the reaction acting on the guide face of the guide and the reaction acting on the cam. The gap is provided between the near side of guide relative to the gear and the locking-member. A reaction acting on the guide face is not directed inward, and a force that causes the locking-member to be pressed down inward is reduced. The direction of the force acting on the locking-member and the direction of the force acting on the guide face of the guide are offset. The offset allows a moment on the guide in a rotational direction to act on the locking-member. The moment is directed to mesh the second teeth of the locking-member and the first teeth of the gear 61 with each other. The moment is directed in the outward direction away from the cam.

The force acting on the cam by the locking-member is reduced by a degree equivalent to the outward force. This reduces deformation of a contact portion between the cam and the locking-member.

Therefore, it is possible to prevent engagement depth between the first teeth of the gear and the second teeth of the locking-member from being reduced as much as possible. This improves coupling strength between the first teeth and the second teeth.

In particular, the action line of the force acting on the locking-member is normal to the gear face of the second tooth at the furthest position from the guide. A gap is formed up to inside of a crossing of the action line and the guide. Therefore, the reaction acting on the guide face of the guide and the reaction acting on locking-member are offset without intersection. The offset enables a moment acting on the locking-member to be amplified, and a force directed outward for meshing with the first teeth is amplified. This further enhances coupling strength between the first teeth of the gear and the second teeth of the locking-member.

In addition, when a force or load for rotating the base and the gear relative to each other exceeds at a predetermined value, the guide face of the guide is deformed. The projection of the locking-member abuts against the near side of the end of the guide relative to the gear. The end of the guide receives a force acting on the locking-member.

In the case, when a great force acts on the locking member, the outer peripheral face of the locking-member is pressed against the guide face of the guide and the end of the locking-member. This distributes the force to reduce a force acting on the guide face, thus reducing the guide face in deformation. The end of the locking-member has a receiving face smaller than the guide face, and the end has a smaller reaction than the guide face. This allows the moment to be produced continuously.

Thus, invention reduces deformation of the guide face, and securely prevents the reduction of engagement depth between the first and second teeth. This provides a seat recliner for a vehicle with further enhanced coupling strength between the first and second teeth.

The end of the guide has an end face abutting against the locking-member, which is inclined outward in the radial direction with respect to a movement direction of the locking-member guided by the guide face. A reaction acting normal to the end face of the end is directed outward, not inward to the cam. The abutting of the locking-member at the outer peripheral face against the end of the guide allows a force not to act on the locking-member to be pressed down inward. The end of the guide prevents inward movement of the locking-member, thus reducing a force acting on the cam. This prevents the deformation of the engagement part of the cam and the locking-member, and prevents the engagement depth between the first and second teeth from being reduced, thus further enhancing strength.

The locking-member is rotatably supported by a pivot. Thus, a gap between the outer peripheral face and the guide produces no tottering of the locking-member in the peripheral direction. Further, the locking-member is rotated on the pivot. Thus, the locking-member presses the guide substantially parallel (in fact, peripheral direction). There are no cases that the outer periphery part of the locking-member with the gap greatly moves to incline the locking-member. This protects mesh of the second teeth, thus preventing lowering of strength.

The action line of the force acting on the locking-member is normal to the gear face of the second tooth at the furthest position from the guide. A gap extends up to inside of a crossing of the action line and the guide. This displaces radially inward a reaction acting on the guide face of the guide. The reaction acting on the guide face and the reaction acting on the locking-member are offset without intersection. This enables a moment acting on the locking-member to be amplified, and an outward force acting on the second teeth for meshing with the first teeth to be amplified. This further enhances coupling strength between the first teeth of the gear and the second teeth of the locking-member.

What is claimed is:

1. A seat recliner comprising:

a base mounted to a first seat member;

a gear mounted to a second seat member and being rotatable relative to the base, the gear having first teeth along a peripheral face of the gear;

a locking member rotatable about a pivot on the base, the locking member having second teeth engageable with the first teeth;

a cam configured to rotate the locking member to engage the first and second teeth with each other for establishing an angle between the first and second seat members;

a guide on the base extending radially from a vicinity of the first teeth to a vicinity of the cam and having a guide face for slidably guiding the locking member to engage the first and second teeth with each other, the guide and the locking member defining a gap therebetween at a near side of the guide face relative to the first teeth so that a near side of the guide face relative to the cam abuts the locking member and maintains the locking member against the gear with the first and second teeth engaged.

2. The seat recliner according to claim 1, wherein an action line is normal to a gear face of a second tooth of the locking-member at the furthest position from the guide, wherein the gap extends radially inside of a position where the action line crosses the guide.

3. The seat recliner according to claim 1, wherein the locking member has an arced outer peripheral part, and wherein the outer peripheral part is slidably supported by the guide face of the guide for engaging the first and second teeth with each other.

4. The seat recliner according to claim 1, wherein the gap extends radially inward from a vicinity of the first teeth, wherein the guide has an end at a near side of the guide relative to the first teeth, wherein the locking member has an outer peripheral face facing the guide, the outer peripheral face having a projection at the near side relative to the first teeth, wherein the end and the projection define a narrowed gap.

5. The seat recliner according to claim 4, wherein the end of the guide has an end face configured to abut against the locking member, and wherein the end face is inclined radially outward relative to a direction of moving the locking member guided by the guide face.

6. The seat recliner according to claim 4, wherein the pivot is positioned in a vicinity of the first gear, wherein the pivot and the guide have the second teeth of the locking member interposed therebetween, and wherein the pivot functions as a fulcrum of the locking member.

7. The seat recliner according to claim 4, wherein an action line is normal to a gear face of a second tooth of the locking member at the furthest position from the guide, and wherein the gap extends radially inward from a vicinity of the first teeth to a position where the action line crosses the guide.

8. The seat recliner according to claim 1, wherein the first teeth exert forces on the locking member, respectively, with the first and second teeth engaged, wherein action lines of the forces intersect the gap and do not intersect the guide face.

* * * * *